United States Patent
Popovic et al.

(10) Patent No.: US 8,050,991 B2
(45) Date of Patent: Nov. 1, 2011

(54) ELECTRONIC BALANCE CHECKING AND CREDIT APPROVAL SYSTEM FOR USE IN CONDUCTING ELECTRONIC TRANSACTIONS

(75) Inventors: Zoran Popovic, Oakville (CA); Steven Smashnuk, Burlington (CA); E. Marcel Oprea, Toronto (CA)

(73) Assignee: DXStorm.com Inc. (CA)

( * ) Notice: Subject to any disclaimer, the term of this patent is extended or adjusted under 35 U.S.C. 154(b) by 638 days.

(21) Appl. No.: 11/397,613

(22) Filed: Apr. 5, 2006

(65) Prior Publication Data

US 2006/0229978 A1 Oct. 12, 2006

Related U.S. Application Data

(60) Provisional application No. 60/760,940, filed on Jan. 23, 2006, provisional application No. 60/668,167, filed on Apr. 5, 2005.

(51) Int. Cl.
G06Q 40/00 (2006.01)
(52) U.S. Cl. .................. 705/35; 705/38; 705/39; 705/44
(58) Field of Classification Search .................... 705/35, 705/44, 38–39
See application file for complete search history.

(56) References Cited

U.S. PATENT DOCUMENTS

| | | | | |
|---|---|---|---|---|
| 4,068,213 | A | * | 1/1978 | Nakamura et al. ............ 235/381 |
| 5,317,636 | A | * | 5/1994 | Vizcaino ........................ 705/65 |
| 6,000,608 | A | * | 12/1999 | Dorf .............................. 235/380 |
| 6,003,019 | A | | 12/1999 | Eaton et al. |
| 6,012,050 | A | | 1/2000 | Eaton et al. |
| 6,023,682 | A | * | 2/2000 | Checchio ........................ 705/18 |
| 6,116,505 | A | * | 9/2000 | Withrow ........................ 235/381 |
| 6,226,624 | B1 | * | 5/2001 | Watson et al. .................. 705/44 |
| 6,283,367 | B1 | * | 9/2001 | Matthew et al. .............. 235/380 |
| 6,601,771 | B2 | * | 8/2003 | Charrin ......................... 235/492 |
| 6,807,602 | B1 | * | 10/2004 | Hornung et al. .................. 711/5 |
| 6,865,547 | B1 | | 3/2005 | Brake, Jr. et al. |
| 7,292,999 | B2 | * | 11/2007 | Hobson et al. .................. 705/65 |
| 2003/0141362 | A1 | * | 7/2003 | Brown et al. ................. 235/380 |
| 2004/0210516 | A1 | * | 10/2004 | Goldman ........................ 705/39 |
| 2004/0230535 | A1 | | 11/2004 | Binder et al. |
| 2005/0080728 | A1 | | 4/2005 | Sobek |
| 2005/0114217 | A1 | | 5/2005 | Monk |

OTHER PUBLICATIONS

"How to protect PC from Viruses" New Straits Times. Kuala Lumpur: Oct. 5, 1998, p. 33 (2 pages).*
WO 98/52167 (Wilczynski), International Pub. Date Nov. 19, 1998.*
WO 02/100061 A2 (Puricelli) International Pub. Date Dec. 12, 2002.*

* cited by examiner

*Primary Examiner* — Elda Milef
(74) *Attorney, Agent, or Firm* — BellesKatz, LLC

(57) ABSTRACT

An electronic balance checking and credit approval system includes consumer transaction accounts, tokens, input devices, authentication hardware and software code capable of execution by the hardware, and output devices. The consumer transaction account is held in trust on behalf of a consumer by a credit extending company. The token is specific to and held by the consumer, and includes a consumer account identifier that is associated with the consumer transaction account. The input device receives the consumer account identifier concurrent with a consumer-initiated request for account balance information. The authentication hardware and software code verifies the consumer-initiated request and the consumer account identifier and authorizes access to the consumer transaction account. The consumer interface apparatus provides the consumer with a real-time account balance datum that is currently associated with the consumer transaction account. The system also includes a system and method for securely and quickly approving credit card transactions by comparing generated checksums with stored historical transaction results.

16 Claims, 15 Drawing Sheets

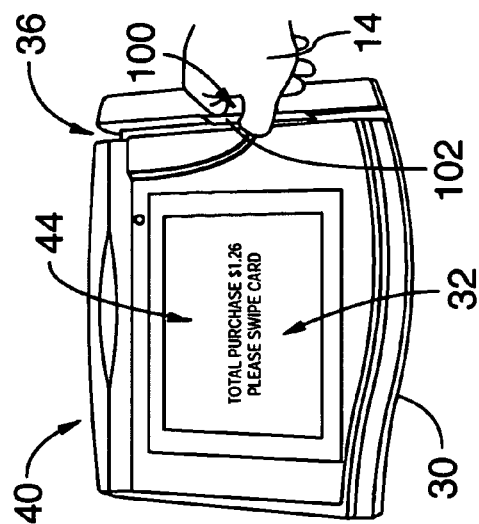
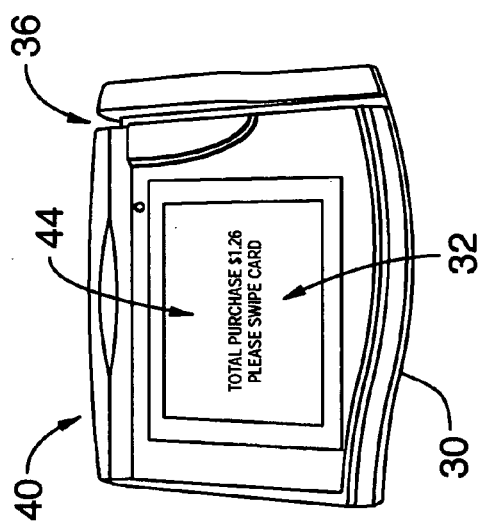
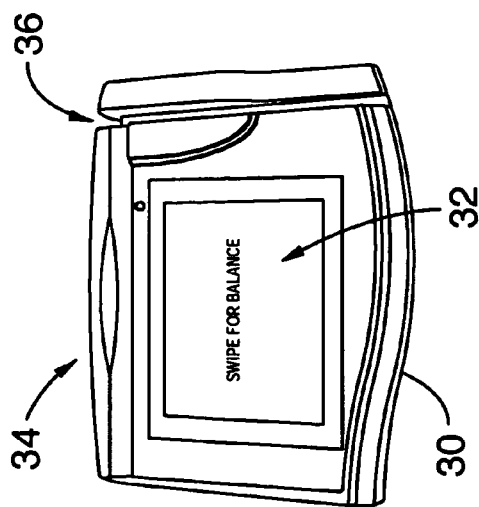
FIG.5C
FIG.5B
FIG.5A

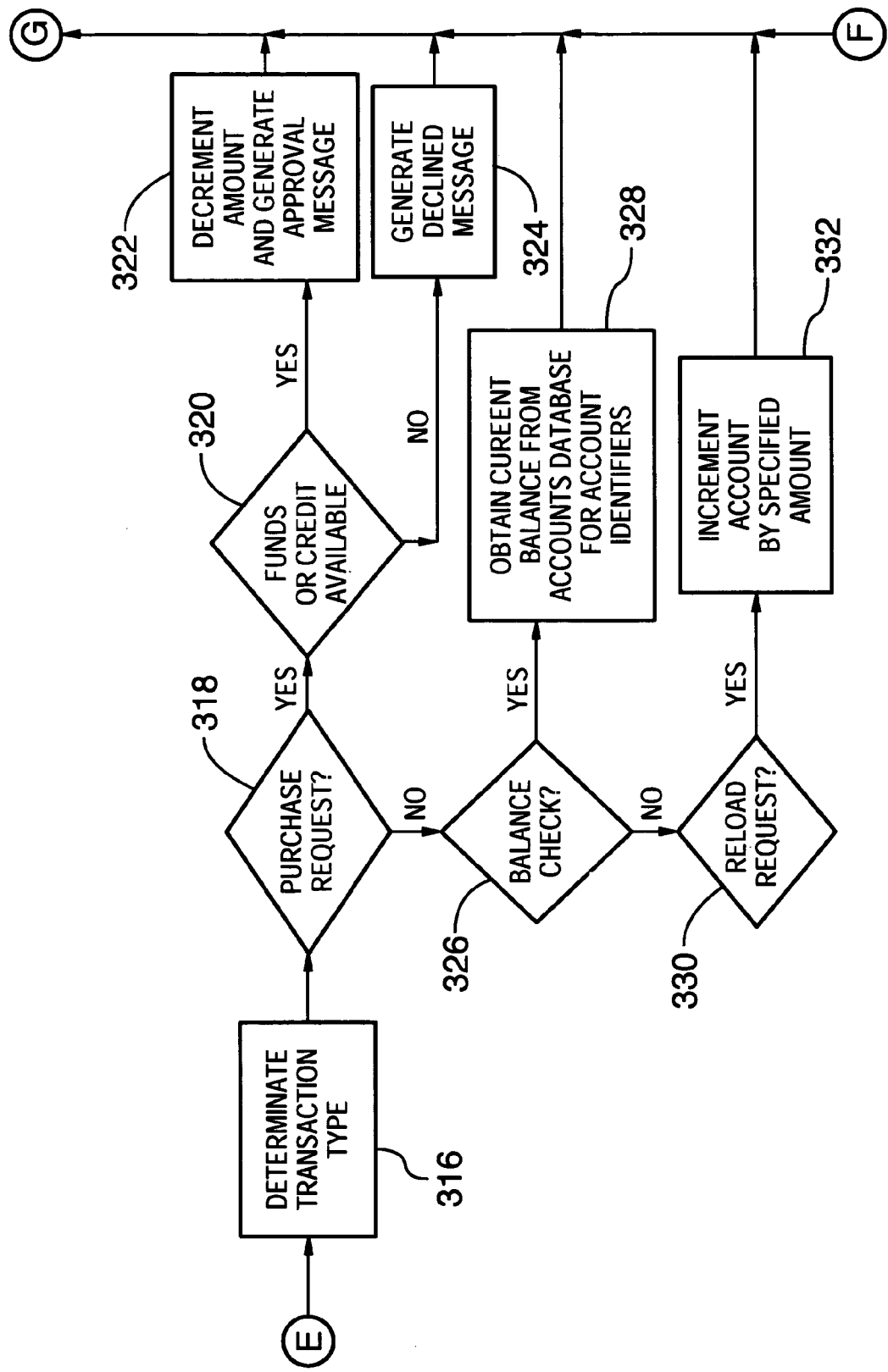

ELECTRONIC BALANCE CHECKING AND CREDIT APPROVAL SYSTEM FOR USE IN CONDUCTING ELECTRONIC TRANSACTIONS

FIELD OF THE INVENTION

The present invention relates to the field of electronic transactions, and more particularly to an electronic balance checking and credit approval system for use in conducting electronic transactions.

BACKGROUND OF THE INVENTION

In the prior art, when conducting electronic transactions at retail stores and over computer networks, consumers using prepaid accounts and credit cards have heretofore been required to keep a substantially accurate mental tally of their account and credit balances, so as to ensure that sufficient funds are available at a particular time to conduct a particular electronic transaction. It will be appreciated that the onus has heretofore been on the consumer to maintain this running tally of their remaining credit, or risk facing the sometimes embarrassing and certainly inconvenient prospect that a particular transaction might be denied due to insufficient funds.

Some retail stores and merchants have the ability to perform a balance inquiry on the consumer's behalf, but in such event, the consumer is first required to physically surrender the payment token or account identifier to the merchant. In typical prior art systems of this general type, the merchant is then required to enter a sequence of keys into their point-of-sale (hereinafter, alternately referred to as "POS") terminal so as to enter a balance-checking mode, before a printed statement of the consumer's account balance can be made available. This prior art process is generally relatively time consuming and requires the direct assistance and intervention of the merchant's POS attendant or cashier as a credit checking intermediary, with the consumer being required to surrender their information related to their personal account and often left feeling embarrassed or disappointed in the event that the account balance is too low to conduct the desired electronic transaction.

That is, in existing transaction processing systems such as Interac, GIVEX, etc., the consumer has little or no ability to obtain a current balance of his or her account before attempting to make a transaction. The consumer may not have sufficient funds, points or credits to complete the transaction, resulting in embarrassment and confusion as to how much is actually available in the account. Similarly, and as alluded to hereinabove, in prior art situations where real-time balances have heretofore been unavailable or substantially inaccessible, the consumer is forced to either lessen the amount of his purchase and try again, or pay using alternate means. In existing systems where balance information is available at the point of sale, the consumer is required to ask the merchant to intervene on his behalf to obtain the personal account balance for him.

In the prior art, methods for authenticating electronic transactions are generally well-known, with some of these methods providing for the presentation of an account balance or credit update after the transaction is completed. Other developments in the field of electronic transactions have enabled consumers to use a transaction token, such as a plastic card bearing a magnetic strip, in more than one context, such as, for example, both as a standard credit card and as a card for performing transactions with a specific vendor. An example of one such system is disclosed in U.S. Pat. No. 6,865,547 (issued on Mar. 8, 2005 to Brake, Jr. et al. for a "Customer Activated Multi-value (CAM) Card"). Notably, the Brake, Jr. patent does not disclose a system that enables balance or credit checking immediately prior to conducting a transaction. As such, a consumer using the Brake, Jr. card would still be faced with the significant problems outlined hereinabove.

What is needed, therefore, is a system that enables consumers to perform an account balance and/or credit inquiry to ascertain the amount of currency and/or credit that is, at the time of the inquiry, available for conducting electronic transactions. Preferably, the system would allow consumers to ensure that adequate currency and/or credit is available before conducting a particular transaction, without the intermediating assistance or intervention of a POS cashier or merchant.

Also, in transactions involving credit cards, and after receiving an identification token from an appropriate credit card, the POS terminal in the store or place of business has heretofore typically sent an initial transaction request to a merchant acquirer and/or payment processing company (such as, for example, Moneris Solutions, Inc. of Buffalo Grove, Ill., or Payment Technologies, Inc. of Mechanicsburg, Pa.). Thereafter, such payment processing company has typically forwarded the transaction request to the appropriate credit card issuing bank, where the request was to be processed for approval. If the credit card transaction was to be approved, the bank would send confirmation of such approval back to the payment processing company, who would then have returned same to the POS terminal that initiated the original request.

Unfortunately, with these prior art systems, and although there has been no guarantee as to how quickly (or, perhaps more accurately, how slowly) the credit card transaction request and approval confirmation processes might have taken in the past, such processes may generally have taken about five seconds or so. This somewhat time consuming and convoluted transaction request and approval process has, nonetheless, been necessitated in order to ensure that a sufficient credit balance is available at a particular time to conduct a particular electronic transaction. This intricate transaction approval process may be especially necessitated in situations where, as may generally be the case, neither the POS terminal, the store, nor the payment processing company is allowed to store the specific identification token that is received from the credit card.

In view of the foregoing, it may be appreciated that the potentially significant amount of time involved in processing and approving credit card transactions may have been found to be too long and/or to have resulted in long wait times or line-ups, with reduced efficiency and/or profitability to the associated businesses, especially in the cases of businesses involving a high rate of transaction turnover, and/or during peak business hours. What is needed, therefore, and whether in combination with or quite apart from any solutions to the other shortcomings discussed hereinabove that may be associated with the prior art, is a system that enables credit card transactions to be processed more quickly, yet still in a substantially reliable manner so as to ensure an appropriate payment history associated with a particular credit card, preferably without involving the storage of a user's personal credit card information.

It is, therefore, an objection of the invention to overcome, alleviate, and/or mitigate one or more disadvantages associated with the prior art.

SUMMARY OF THE INVENTION

According to the invention, there is disclosed a secure credit approval system for use by a vendor, a consumer, and a credit extending entity in conducting an electronic transaction over a communication network. According to the invention, the system includes a consumer transaction account administered by the credit extending entity on behalf of the consumer. The system also includes a consumer specific token, held by the consumer, that includes one or more account data identifying the consumer transaction account. The system also includes an input device that ephemerally receives the account data from the consumer specific token. The system also includes checksum hardware and software code capable of execution by the hardware that electronically receives the account data from the input device. The checksum hardware and software code includes a checksum generating means for electronically generating, using a predetermined algorithmic model, an account checksum value for each set of the account data. Each of the account checksum values is substantially unique to each of the sets of the account data. The checksum hardware and software code also includes it creditor querying means for sending the account data as part of a final approval request which is transmitted over the communication network, substantially remotely of the input device, to the credit extending entity. According to the invention, the checksum hardware and software code discards the account data after generating the account checksum value and sending the final approval request. The system also includes a final result signal which is generated by the credit extending entity, in response to the final approval request, and transmitted over the communication network. The system also includes a point-of-sale subsystem, operated by the vendor, for concluding the electronic transaction, with the point-of-sale subsystem receiving the final result signal from the communication network. The system also includes a checksum database having a plurality of archived checksum values stored therein, with each respective one of the archived checksum values having at least one related archived payment history value that is likewise stored in the checksum database. The system also includes a payment history analysis means for electronically generating, and sending to the point-of-sale subsystem, a preliminary approval signal on a substantially instantaneous basis when the account checksum value matches a corresponding one of the archived checksum values, provided that its aforesaid related archived payment history value complies with one or more predetermined approval criteria. According to the invention, when the preliminary approval signal is received by the point-of-sale subsystem, the point-of-sale subsystem provides preliminary approval of the electronic transaction on a substantially instantaneous basis and substantially before receiving the final result signal.

According to an aspect of one preferred embodiment of the invention, each aforesaid account checksum value and each of the archived checksum values is substantially encrypted, by using the predetermined algorithmic model as aforesaid, such that the account data is substantially indecipherable therefrom.

According to an aspect of one preferred embodiment of the invention, when the account checksum value differs from each of the archived checksum values, the point-of-sale subsystem awaits receipt of the final result signal before concluding the electronic transaction.

According to an aspect of one preferred embodiment of the invention, the final result signal comprises a signal selected, by the credit extending entity, from the group consisting of a final approval signal and a final refusal signal. According to this aspect of the invention, when the account checksum value differs from each of the archived checksum values, the point-of-sale subsystem provides final approval of the electronic transaction after receiving the final approval signal, and provides final refusal of the electronic transaction after receiving the final refusal signal.

According to an aspect of one preferred embodiment of the invention, the system also includes database storage means for, when the account checksum value differs from each of the archived checksum values, storing the account checksum value in the checksum database as one of the plurality of archived checksum values.

According to an aspect of one preferred embodiment of the invention, for each aforesaid corresponding one of the archived checksum values, the database storage means additionally stores in the checksum database at least a last one the final result signal as at least a portion of its aforesaid related archived payment history value.

According to an aspect of one preferred embodiment of the invention, the payment history analysis means electronically generates the preliminary approval signal, provided that the aforesaid last one aforesaid final result signal, stored as at least the portion of the related archived payment history value of the corresponding one of the archived check sum values, comprises the final approval signal.

According to an aspect of one preferred embodiment of the invention; when the preliminary approval signal is received by the point-of-sale subsystem, the point-of-sale subsystem substantially concludes the electronic transaction with the consumer substantially before receiving the final result signal.

According to an aspect of one preferred embodiment of the invention, the predetermined approval criteria include a predetermined set of instant approval parameters.

According to an aspect of one preferred embodiment of the invention, the instant approval parameters are selectively predetermined by the vendor.

According to an aspect of one preferred embodiment of the invention, the instant approval parameters comprise a range of approved dollar values for the electronic transaction.

According to an aspect of one preferred embodiment of the invention, the instant approval parameters comprise at least one range of approved date/time values for the electronic transaction.

According to an aspect of one preferred embodiment of the invention, the instant approval parameters comprise a listing of approved products/services for the electronic transaction.

According to an aspect of one preferred embodiment of the invention, when the account checksum value differs from each of the archived checksum values, the creditor querying means transmits the final approval request to the credit extending entity on a substantially instantaneous basis.

According to an aspect of one preferred embodiment of the invention, the input device comprises a terminal provided substantially locally of the point-of-sale subsystem, with the terminal electronically receiving the account data from the consumer specific token.

According to an aspect of one preferred embodiment of the invention, the one or more account data comprise at least one datum selected from the group consisting of numeric, alphabetic, photographic and pictographic data.

According to an aspect of one preferred embodiment of the invention, the one or more account data comprise at least one datum selected from the group consisting of personal data specific to the consumer, and data specific to at least one of the consumer transaction account, the credit extending entity, and the consumer specific token.

According to an aspect of one preferred embodiment of the invention, the personal data specific to the consumer comprise at least one personal datum selected from the group consisting of name data, home address data, birthdate data, and biometric data.

According to an aspect of one preferred embodiment of the invention, the aforesaid at least one datum is additionally selected from the group consisting of account password data, token expiry date data, and token type data sufficient to identify the general type of the consumer specific token.

According to an aspect of one preferred embodiment of the invention, the consumer specific token is a plastic card including a readable magnetic strip.

According to an aspect of one preferred embodiment of the invention, the account data comprise credit card account identifiers.

According to an aspect of one preferred embodiment of the invention, the credit extending entity is a credit card issuing bank.

According to an aspect of one preferred embodiment of the invention, the creditor querying means transmits the final approval request over the communication network, through an intermediary payment processing company, to the credit extending entity.

According to an aspect of one preferred embodiment of the invention, the system also includes token sorting means for ascertaining when the consumer specific token is a credit card.

According to the invention, there is also disclosed a balance checking transaction system for use by a consumer, a transaction processing entity, a vendor, and one or more trust account chartered banks in conducting an electronic transaction over a communication network. According to the invention, the system comprises a first consumer account held by the transaction processing entity on behalf of the consumer. The system also includes a consumer specific token held by the consumer, with the consumer specific token including a token data set that identifies the first consumer account. The system also includes an input device that receives the token data set from the consumer specific token and transmits the token data set along with an input device datum over the communication network. The system also includes authentication hardware and software code capable of execution by the hardware situated substantially remotely of the input device, that receives the token data set over the communication network. The authentication hardware and software code verifies the token data set and the input device datum against at least one database containing a plurality of archived data sets and input device data, so as to thereafter retrieve an account balance datum that is currently associated with the first consumer account. The authentication hardware and software code thereafter transmits the account balance datum over the communication network on a substantially instantaneous basis. The system also includes an output device, situated substantially locally to the input device, that receives the account balance datum over the communication network and provides the account balance datum to the consumer on the aforesaid substantially instantaneous basis. The system also includes a point-of-sale subsystem, operated by the vendor, that electronically interfaces with the authentication hardware and software code over the communication network, so as to enable the electronic transaction to be conducted substantially concurrent with provision of the account balance datum to the consumer as aforesaid. The system also includes a transaction account held by one of the banks on behalf of the transaction processing entity. According to the invention, responsive to a decrement request of the transaction processing entity, the aforesaid one of the banks transfers an amount of funds from the transaction account to the vendor in respect of the electronic transaction.

According to an aspect of one preferred embodiment of the invention, the input device enables the consumer to selectively conduct a balance query, such that the output device provides the account balance datum before enabling the electronic transaction to be conducted.

According to an aspect of one preferred embodiment of the invention, the input device enables the consumer to selectively conduct a purchase query, such that the electronic transaction is conducted immediately prior to provision of the account balance datum to the consumer. According to this aspect of the invention, the authentication hardware and software code debits a purchase amount to the first consumer account substantially immediately after the electronic transaction. As such, the account balance provided by the output device to the consumer indicates the purchase amount having been debited from the first consumer account.

According to an aspect of one preferred embodiment of the invention, the input device enables the consumer to selectively send a recharge request to the authentication hardware and software code in order to recharge the first consumer account. According to this aspect of the invention, the recharge request includes a recharge amount which is credited by the authentication hardware and software code to the first consumer account. According to this aspect of the invention, the system further comprises a second consumer account held by one of the banks on behalf of the consumer. The same or another one of the banks, responsive to an increment request of the transaction processing entity, transfers an amount of funds from the second consumer account to the transaction account in respect of the recharge request.

According to an aspect of one preferred embodiment of the invention, the input device substantially encrypts the token dam set alone the input device datum, as an encrypted block which is then transmitted over the communication network. According to this aspect of the invention the authentication hardware and software code decrypts the encrypted block into the token data and the input device datum, before verifying the token data set and the input device datum against the at least one database as aforesaid.

According to an aspect of one preferred embodiment of the invention, the input device and the output device are together provided within a single terminal.

According to a further aspect of this preferred embodiment of the invention, the terminal may preferably be situated substantially adjacent to the point-of-sale subsystem, such as to enable the terminal to receive the token data set from the consumer specific token, held by the consumer, substantially adjacent to the point-of-sale subsystem.

According to a different aspect of another preferred embodiment of the invention, the input device and the output device may preferably be situated substantially remotely of the point-of-sale subsystem.

According to an aspect of one preferred embodiment of the invention, the system may preferably further comprise a plurality of supplemental input devices and supplemental output devices. Each respective one of the supplemental input devices has a supplemental input device datum, and each aforesaid supplemental input device datum is substantially unique to each aforesaid respective one of the supplemental input devices. As such, the system enables the account balance datum to be directed to a corresponding one of the supplemental output devices which is situated substantially locally to the respective one of the supplemental input devices.

According to an aspect of one preferred embodiment of the invention, the output device comprises a display screen that displays the account balance datum within view of the consumer.

According to an aspect of one preferred embodiment of the invention, the consumer specific token generates a radio frequency identification signal.

According to an aspect of one preferred embodiment of the invention, the token data set comprises at least one datum selected from the group consisting of numeric, alphabetic, photographic and pictographic data.

According to an aspect of one preferred embodiment of the invention, the token data set comprises at least one datum selected from the group consisting of personal data specific to the consumer, and data specific to at least one of the first consumer account, the transaction processing entity, the second consumer account, the bank, and the consumer specific token.

According to an aspect of one preferred embodiment of the invention, the personal data specific to the consumer comprises at least one personal datum selected from the group consisting of name data, home address data, birthdate data, and biometric data.

According to an aspect of one preferred embodiment of the invention, the aforesaid at least one datum is additionally selected from the group consisting of account password data, token expiry date data, and token type data sufficient to identify the general type of the consumer specific token.

According to the invention, there is also disclosed a secure credit approval and balance checking system for use by a vendor, a consumer, a credit extending entity, a transaction processing entity, and a trust account chartered bank in conducting an electronic transaction over a communication network. According to the invention, the system includes a first consumer account administered by the transaction processing entity on behalf of the consumer. The system also includes a second consumer account administered by the credit extending entity on behalf of the consumer. Still further, the system comprises a consumer specific token which is held by the consumer. The consumer specific token includes a consumer data set. The consumer data set comprises at least one data set that is selected from the group consisting of: (i) one or more account data identifying the second consumer account; and (ii) a token data set that identifies the first consumer account. The system also includes an input device that ephemerally receives the consumer data set from the consumer specific token. A token sorting means of the system ascertains when the consumer data set identifies the first consumer account, and when the consumer data set identifies the second consumer account. When the consumer data set identifies the first consumer account, the token sorting means transmits the token data set along with an input device datum over the communication network. The system also includes checksum hardware and software code capable of execution by the hardware that electronically receives the account data from the input device when the consumer data set identifies the second consumer account. The checksum hardware and software code includes a checksum generating means for electronically generating, using a predetermined algorithmic model, an account checksum value for each set of the account data. Each aforesaid account checksum value is substantially unique to each aforesaid set of the aforesaid account data. The checksum hardware and software code also includes a creditor querying means for sending the account data as part of a final approval request which is transmitted over the communication network, substantially remotely of the input device, to the credit extending entity. The checksum hardware and software code discards the account data after generating the account checksum value and sending the final approval request. The system also includes a final result signal which is generated by the credit extending entity, in response to the final approval request. The final result signal is transmitted over the communication network. The system also includes authentication hardware and software code, situated substantially remotely of the input device, that receives the token data set over the communication network when the consumer data set identifies the first consumer account. The authentication hardware and software code verifies the token data set and the input device datum against at least one database containing a plurality of archived data sets and input device data, so as to retrieve an account balance datum that is currently associated with the consumer transaction account. The authentication hardware and software code thereafter transmits the account balance datum over the communication network on a substantially instantaneous basis. The system also includes an output device, situated substantially locally to the input device, that receives the account balance datum over the communication network and provides the account balance datum to the consumer on the aforesaid substantially instantaneous basis when the consumer data set identifies the first consumer account. According to the invention, the system also includes a point-of-sale subsystem that is operated by the vendor. When the consumer data set identifies the second consumer account as aforesaid, the point-of-sale subsystem is provided for concluding the electronic transaction, with the point-of-sale subsystem receiving the final result signal from the communication network. When the consumer data set identifies the first consumer account as aforesaid, the point-of-sale subsystem electronically interfaces with the authentication hardware and software code over the communication network, so as to enable the electronic transaction to be conducted substantially concurrent with provision of the account balance datum to the consumer as aforesaid. According to the invention, the system also includes a transaction account which is administered by the bank on behalf of the transaction processing entity. When the consumer data set identifies the first consumer account as aforesaid, the bank, responsive to a decrement request of the transaction processing entity, transfers an amount of funds from the transaction account to the vendor in respect of the electronic transaction. According to the invention, the system also includes a checksum database having a plurality of archived checksum values stored therein. Each respective one of the archived checksum values has at least one related archived payment history value that is likewise stored in the checksum database. The system also includes a payment history analysis means for electronically generating, and sending to the point-of-sale subsystem, a preliminary approval signal on a substantially instantaneous basis when the account checksum value matches a corresponding one of the archived checksum values, provided that its aforesaid related archived payment history value complies with one or more predetermined approval criteria. According to the invention, when the preliminary approval signal is received by the point-of-sale subsystem, the point-of-sale subsystem provides preliminary approval of the electronic transaction on a substantially instantaneous basis and substantially before receiving the final result signal.

According to an aspect of one preferred embodiment of the invention, the system is adapted for use over commodity packet switched networks in an online environment.

According to an aspect of one preferred embodiment of the invention, the system according also includes strong security authentication subsystems to maximize the security and authenticity of the electronic transactions processed thereby.

According to an aspect of one preferred embodiment of the invention, when the consumer data set identifies the first consumer account, the token data set is received by the input device substantially concurrently with a consumer-initiated request for the account balance information.

According to the invention, there is also disclosed a secure balance checking and credit approval system for use by a consumer, a vendor, a transaction processing entity, a bank, and a credit extending entity in conducting electronic transactions over a communication network. According to the invention, the system comprises an input token and a means for determining whether the input token is a credit card. According to the invention, in the event that the input token is not a credit card, the system provides a substantially instantaneous account balance display in response to a consumer initiated inquiry, as well as automated authentication of electronic transactions. According to the invention, the system is configured to (i) implement multiple authentication methods, (ii) enable an account holder to initiate a request and receive real-time account balance and credit information, and (iii) enable retail point-of-sale (POS) systems to authenticate transactions over commodity packet switched networks in an online environment. According to the invention, the system further comprises strong security authentication subsystems to maximize the security and authenticity of the electronic transactions processed thereby. The system also includes a consumer transaction account held in trust on behalf of the consumer by the credit extending entity. According to the invention, and at least in the event that the input token is not a credit card, the input token comprises a consumer specific token, held by the consumer, which includes at least one consumer account identifier that is associated with the consumer transaction account. According to the invention, the system also includes an input device for receiving the aforesaid at least one consumer account identifier substantially concurrent with a consumer-initiated request for the account balance information. The system further comprises authentication hardware and software code for verifying the consumer-initiated request and the at least one consumer account identifier and for authorizing access to the consumer transaction account. Still further, the system includes an output device for providing the consumer with a real-time account balance datum that is currently associated with the consumer transaction account. According to the invention, the at least one consumer account identifier is transmitted over the computer network. According to the invention, the authentication hardware and software code interfaces with a retail POS system so as to enable an electronic transaction to be conducted following provision of the real-time credit balance datum to the consumer. According to the invention, in the alternative event that the input token is a credit card, the system further comprises a POS terminal that is adapted to electronically receive one or more identification tokens that are associated with a particular credit card. According to the invention, the system electronically generates, using an algorithmic model, a practically unique check sum for any particular credit card and its identification tokens, with the unique check sum being substantially encrypted such that neither the identification tokens nor the particular credit card may be substantially discerned therefrom. According to the invention, the system electronically compares the generated check sum with check sums that have been previously stored in an electronic database. According to the invention, and in the event that the generated check sum does not match any of the check sums already stored in the database, the system sends transaction approval requests to an appropriate credit card issuing bank, through an intermediary payment processing company. According to the invention, the system stores the generated check sum in the database together with returned results of the transaction approval requests. According to the invention, in the alternative event that the generated check sum matches one of the check sums already stored in the database, the system generates a transaction approval database query of the database to ascertain whether there is an appropriate payment history associated with the generated check sum. In dependent relation thereon, the system returns a database query result approving or declining any particular credit card transaction on a substantially instantaneous basis. According to the invention, the system determines whether the payment history is appropriate by analyzing the returned results of previous transaction approval requests that have been associated with the generated check sum. According to the invention, after the credit card holder has concluded the transaction at the POS terminal on the substantially instantaneous basis, as aforesaid, the system sends the transaction approval request to the appropriate credit card issuing bank, and awaits the returned result, without requiring the continued presence of the credit card holder at the POS terminal. According to the invention, the database query result, approving or declining the particular credit card transaction, is determined in further dependent relation upon a predetermined set of instant approval parameters. According to the invention, the instant approval parameters are selectively predeterminable by a merchant operating the POS terminal. The instant approval parameters may preferably include predetermined parameters that are specific to (i) the dollar amount associated with the transaction approval database query, (ii) the time of day associated with the transaction approval database query, and (iii) the product associated with the transaction approval database query.

Still further, in accordance with the present invention there is disclosed a system that may preferably, but not necessarily, provide a real-time account balance and credit display in response to a consumer initiated inquiry, as well as automated authentication of electronic transactions.

In accordance with another aspect of the invention, there is disclosed an online transaction system that may preferably, but not necessarily, be configurable to implement multiple authentication methods.

In accordance with a further aspect of the invention, there is disclosed an online transaction system that may, according to a preferred embodiment, enable an account holder to initiate a request and receive real-time account balance and credit information.

In accordance with still another aspect of the invention, there is disclosed a system that may preferably, but not necessarily, enable retail POS systems to authenticate transactions over commodity packet switched networks in an online environment.

In accordance with a still further aspect of the invention, there is disclosed a system that may preferably, but not necessarily, be provided with strong security authentication methods to maximize the security and authenticity of the electronic transactions processed thereby.

In accordance with yet another aspect of the invention, there is disclosed a system that may preferably, but not necessarily, provide accounts which implement automated enrollment methods.

In accordance with one aspect of the invention, there is disclosed a system that may preferably, but not necessarily, include (i) a consumer transaction account held in trust on behalf of a consumer by a credit extending entity, (ii) a consumer specific token, held by the consumer, and comprising at least one consumer account identifier that is associated with the consumer transaction account, (iii) a query means for receiving the at least one consumer account identifier substantially concurrent with a consumer-initiated request for account balance or credit information, (iv) authentication hardware and software code capable of execution by the hardware for verifying the consumer-initiated request and the at least one consumer account identifier and for authorizing access to the consumer transaction account, and (v) a consumer interface means for providing the consumer with a real-time account balance or credit datum that is currently associated with the consumer transaction account.

In accordance with a further aspect of a preferred embodiment of the invention, there is disclosed a system wherein the at least one consumer account identifier may preferably, but not necessarily, comprise, either singly or in combination, one or more of the following: an account password, a readable magnetic strip, a radio frequency identifier, and a biometric datum.

In accordance with yet another aspect of one preferred embodiment of the invention, there is disclosed a system wherein the query means may preferably, but not necessarily, comprise consumer facing hardware and software code for reading the at least one consumer account identifier from the consumer specific token.

In accordance with one aspect of the invention, there is disclosed a system that may preferably, but not necessarily, further comprise a computer network for transmitting the at least one consumer account identifier, with the authentication hardware and software code being situated remotely of the consumer specific token, the query means, and the consumer interface means.

In accordance with another aspect of the invention, there is disclosed a system wherein the computer network may preferably, but not necessarily, be the Internet.

In accordance with one aspect of the invention, there is disclosed a system wherein the consumer interface means may preferably, but not necessarily, comprise a display means for displaying, within view of the consumer, the real-time credit balance datum.

In accordance with a still yet further aspect of the invention, there is disclosed a system wherein the authentication hardware and software code may preferably interface with a retail POS system so as to preferably, but not necessarily, enable an electronic transaction to be conducted following provision of the real-time credit balance datum to the consumer.

In accordance with a different aspect of the invention, there is disclosed a system that may preferably enable credit card transactions to be processed more quickly.

In accordance with one aspect of a preferred embodiment of the invention, the system may preferably enable credit card transactions to be processed in a substantially reliable manner.

In accordance with another aspect of one preferred embodiment of the invention, the system may preferably, but not necessarily, ensure an appropriate payment history associated with a particular credit card before approving any particular corresponding credit card transaction.

In accordance with an aspect of a further preferred embodiment of the invention, the system may preferably, but not necessarily, enable the processing of credit card transactions substantially without storage of a user's personal credit card information, aside from its check sum.

In accordance with a further aspect of one preferred embodiment of the invention, a POS terminal is preferably provided according to the system and may preferably electronically receive one or more identification tokens that are associated with a particular credit card.

In accordance with one aspect of a preferred embodiment of the invention, the system may preferably electronically generate, using an algorithmic model, a practically unique check sum for any particular credit card and its identification tokens.

In accordance with a further aspect of the preferred embodiment of the invention, the unique check sum is preferably, but not necessarily, substantially encrypted such that preferably neither the identification tokens nor the particular credit card may be substantially discerned therefrom.

In accordance with one aspect of a preferred embodiment of the invention, the system preferably, but not necessarily, electronically compares the generated check sum with check sums that have been previously stored in an electronic database.

In accordance with an aspect of one preferred embodiment of the invention, and in the event that the generated check sum does not match any of the check sums already stored in the database, the system may preferably send one or more transaction approval requests to an appropriate credit card issuing bank, possibly through an intermediary payment processing company; the generated check sum may then preferably be stored in the database together with one or more returned results of the transaction approval requests.

In accordance with another aspect of one preferred embodiment of the invention, and in the event that the generated check sum matches one of the check sums already stored in the database, the system may preferably generate a transaction approval database query of the database to ascertain whether there is an appropriate payment history associated with the generated check sum and, in dependent relation thereon, return a database query result approving or declining any particular credit card transaction on a substantially instantaneous basis.

In accordance with a further preferred aspect of this embodiment of the invention, the system may preferably, but not necessarily, determine whether the payment history may be appropriate by analyzing the returned results of one or more previous transaction approval requests that may have been associated with the generated check sum.

In accordance with a further aspect of one preferred embodiment of the invention, after the credit card holder may have concluded the transaction at the POS terminal, the system may preferably send the transaction approval request to the appropriate credit card issuing bank, and await the returned result preferably without still also requiring the continued presence of the credit card holder at the POS terminal.

In accordance with one aspect of a preferred embodiment of the invention, the database query result approving or declining the particular credit card transaction may preferably, but not necessarily, be determined in further dependent relation upon a predetermined set of instant approval parameters.

In accordance with a further aspect of one preferred embodiment of the invention, the instant approval parameters may be selectively predetermined by a merchant operating the POS terminal.

In accordance with another aspect of one preferred embodiment of the invention, the instant approval parameters may preferably, but not necessarily, include predetermined parameters that are specific to the dollar amount associated with the transaction approval database query.

In accordance with one aspect of a preferred embodiment of the invention, the instant approval parameters may preferably, but not necessarily, include predetermined parameters that are specific to the time of day associated with the transaction approval database query.

In accordance with an aspect of one preferred embodiment of the invention, the instant approval parameters may preferably, but not necessarily, include predetermined parameters that are specific to the product associated with the transaction approval database query.

It is thus an object of this invention to obviate or mitigate at least one of the above mentioned disadvantages of the prior art.

Other advantages, features and characteristics of the present invention, as well as methods of operation and functions of the related elements of the structure, and the combination of parts and economies of manufacture, will become more apparent upon consideration of the following detailed description with reference to the accompanying drawings, the latter of which are briefly described hereinbelow.

BRIEF DESCRIPTION OF THE DRAWINGS

The novel features which are believed to be characteristic of the electronic balance checking system for use in conducting electronic transactions according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIGS. 5A to 5E depict, in sequence, a method of making a purchase according to one aspect of the invention, showing the display and input terminal of FIG. 4A;

FIGS. 7A to 7E together depict a diagrammatic flowchart of a method and system according to one preferred embodiment of the balance checking portion of the system of FIG. 2.

DETAILED DESCRIPTION OF A PREFERRED EMBODIMENT

Figure 1:
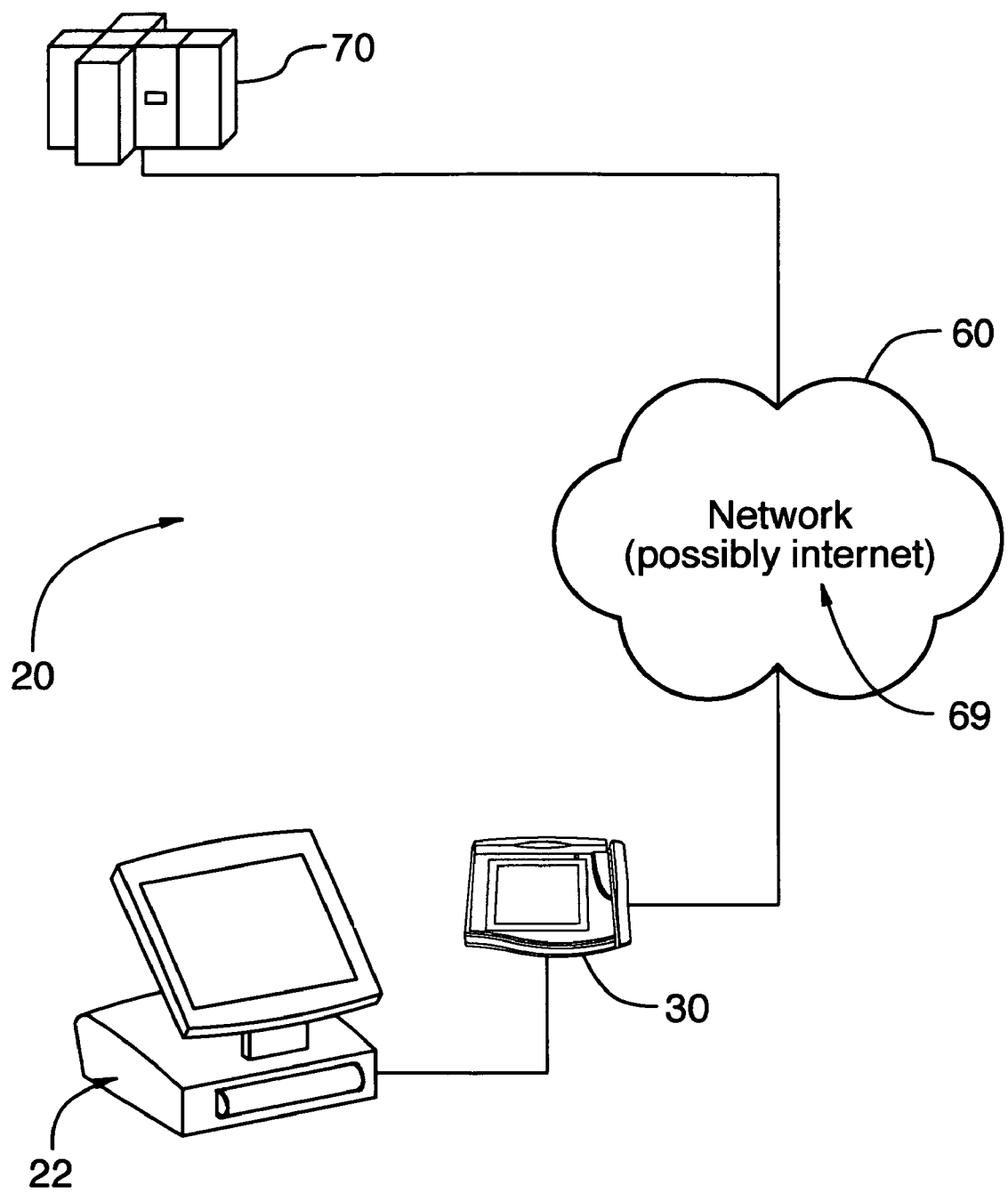
FIG. 1 is a simplified diagrammatic representation of a secure credit approval and balance checking system according to the present invention.
Figure 4A:
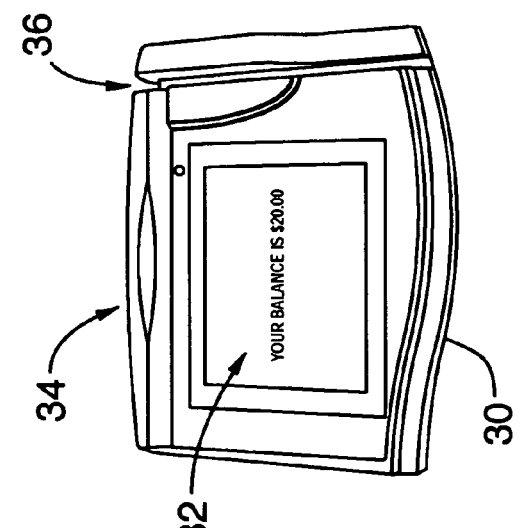
FIGS. 4A to 4C depict, in sequence, a method of checking a balance according to the invention, showing a display and input terminal of the system of FIG. 3.
Figure 4B:
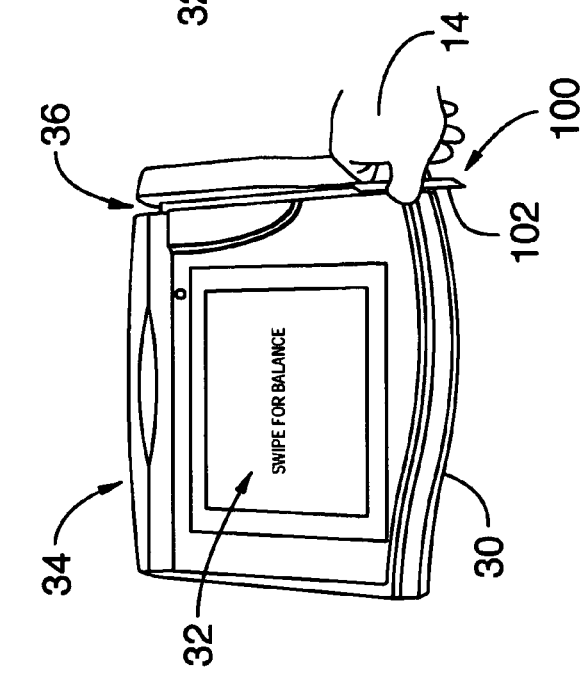
Figure 4C:
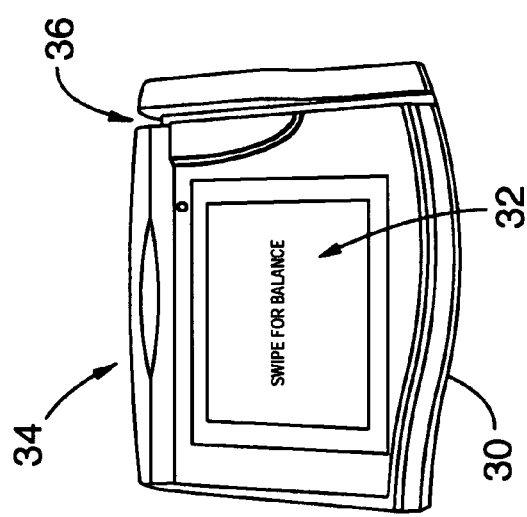
Figure 5E:
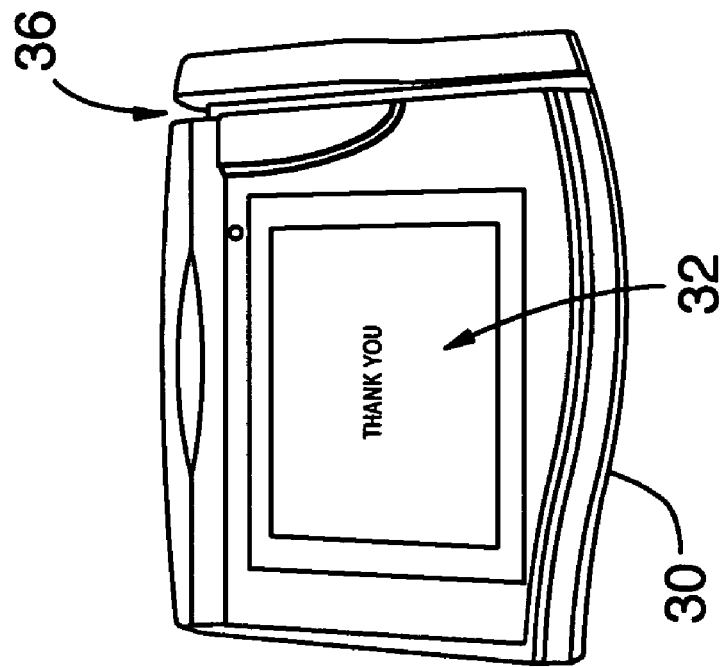
Figure 5D:
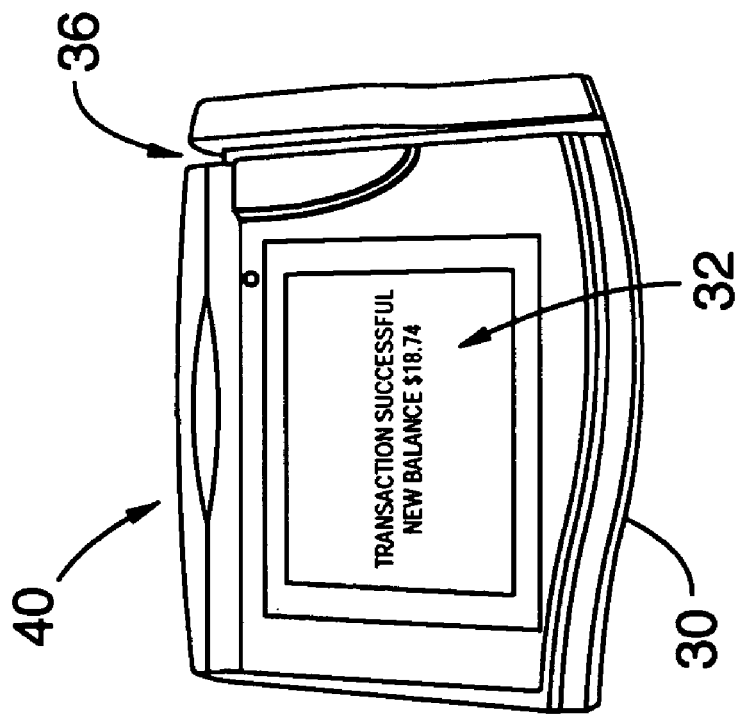
Figure 6C:
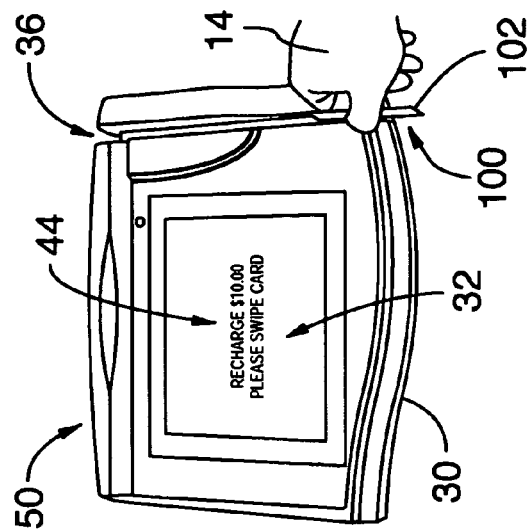
FIGS. 6A to 6E depict, in sequence, a method of recharging a consumer specific token according to the invention, showing the display and input terminal of FIG. 4A.
Figure 6B:
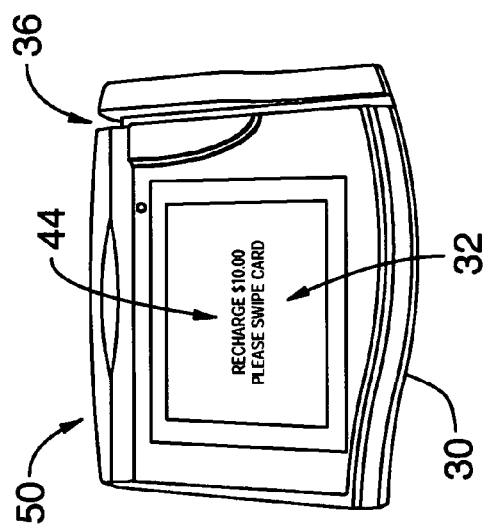
Figure 6A:
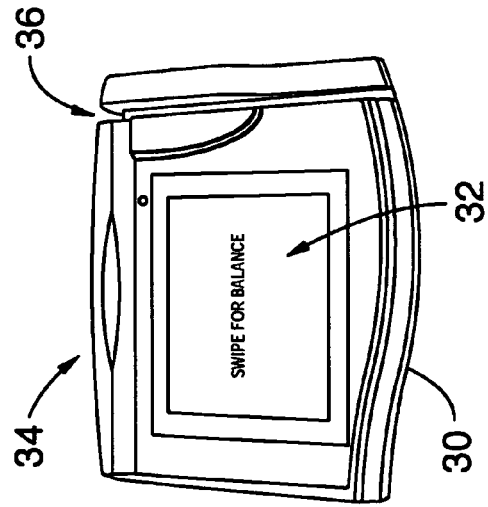
Figure 6E:
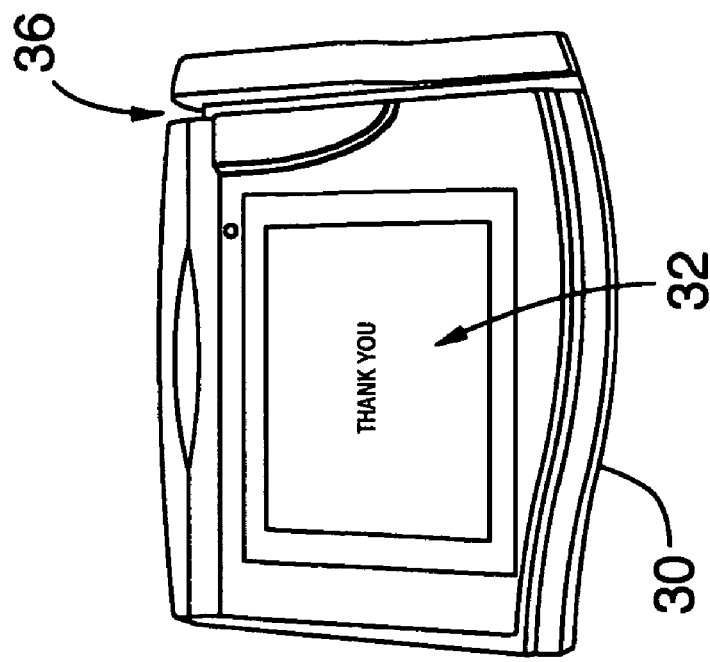
Figure 6D:
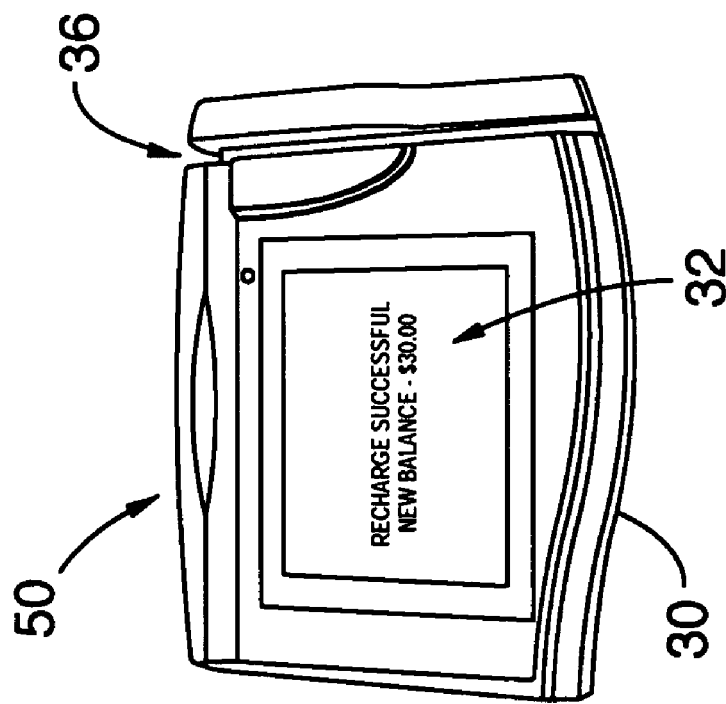
Figure 7A:
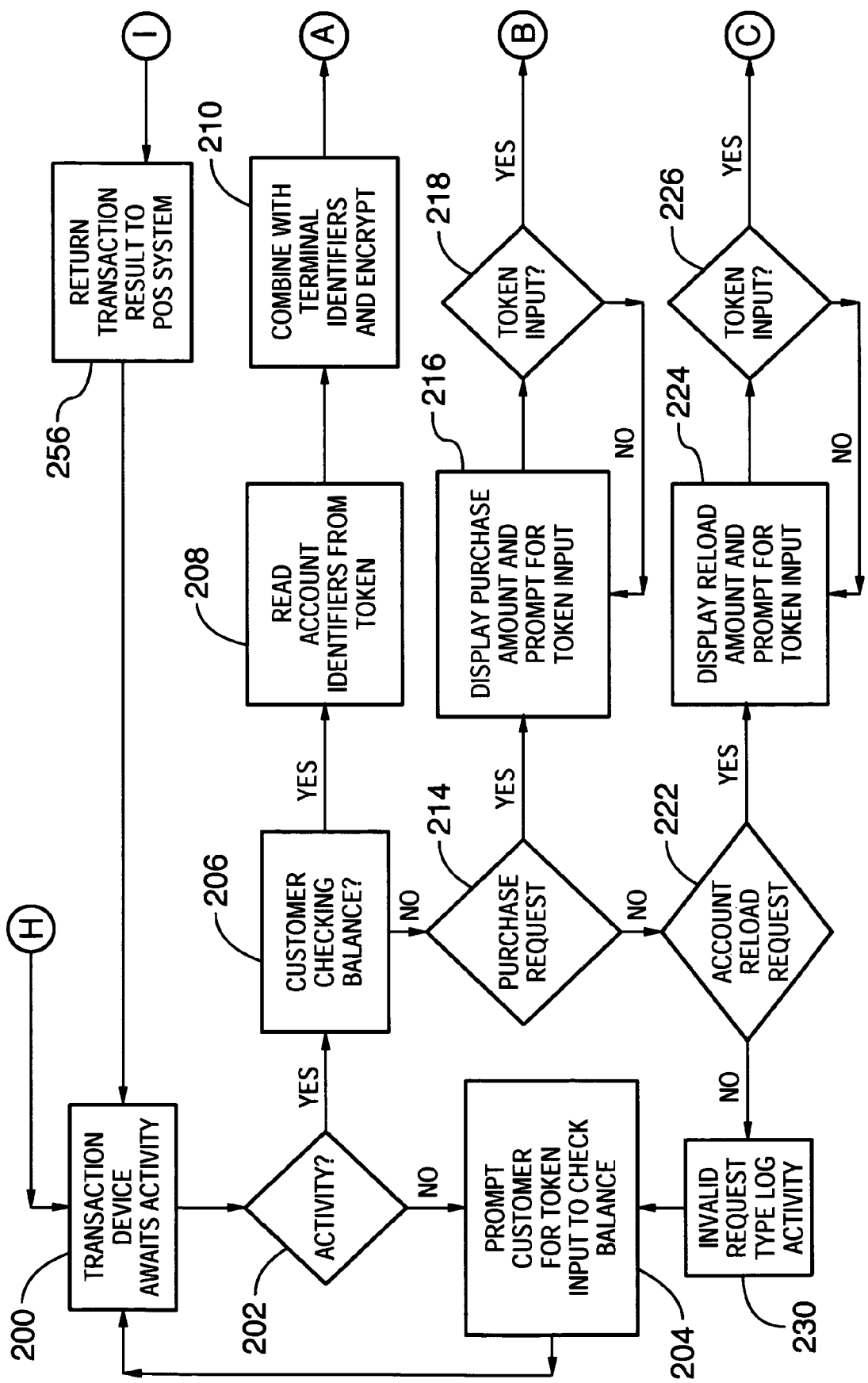
Figure 7B:
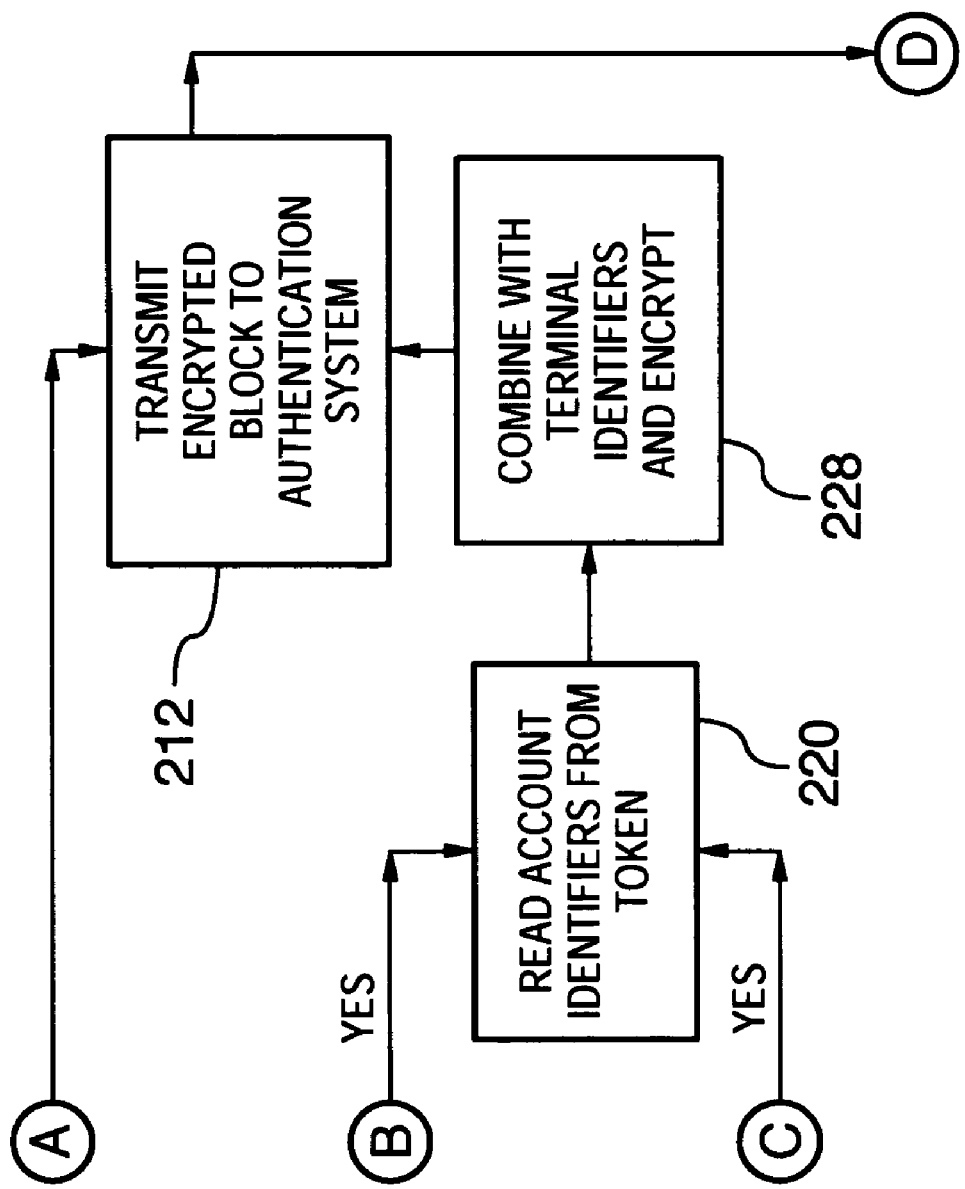
Figure 7C:
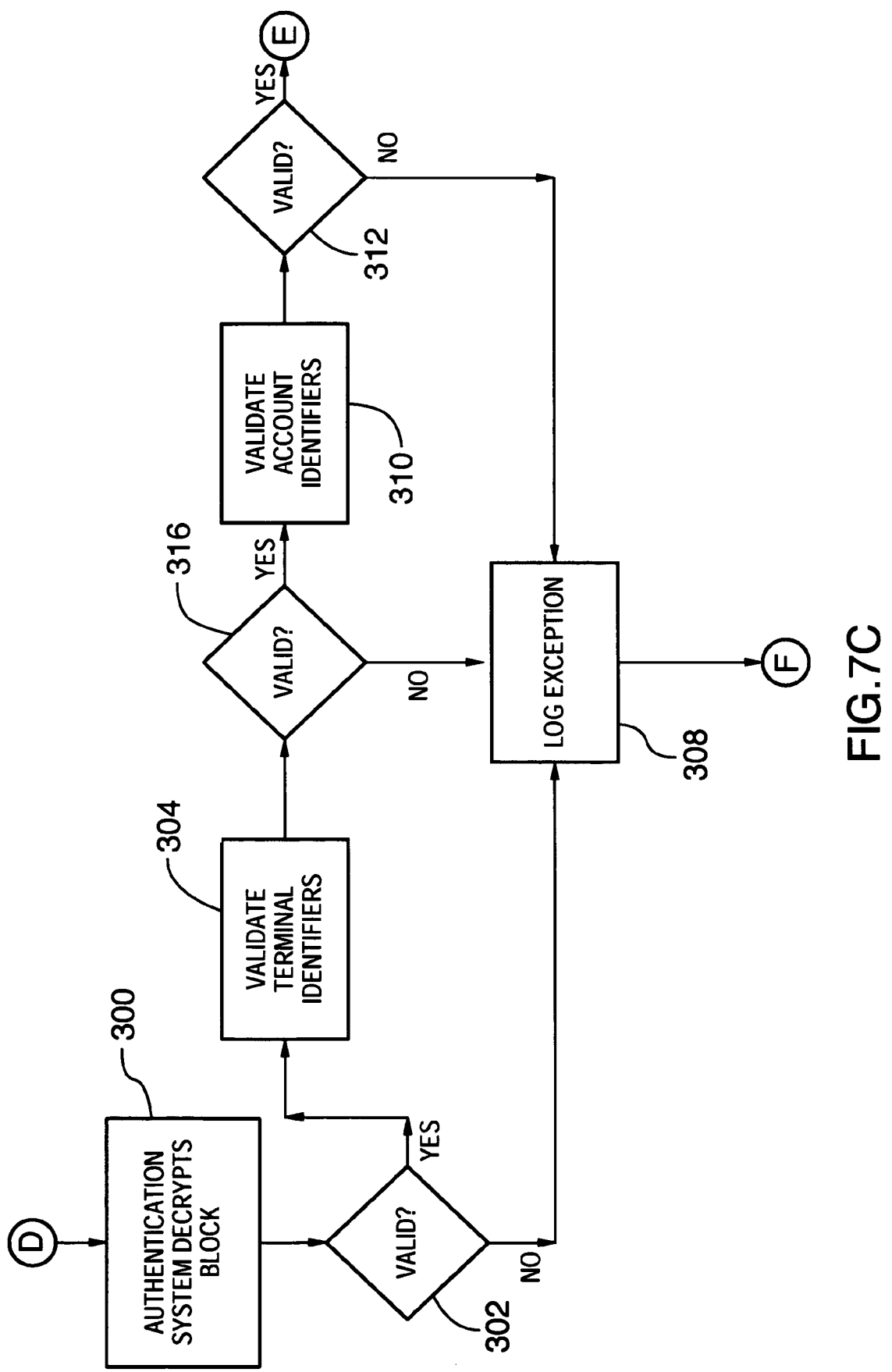
Figure 7E:
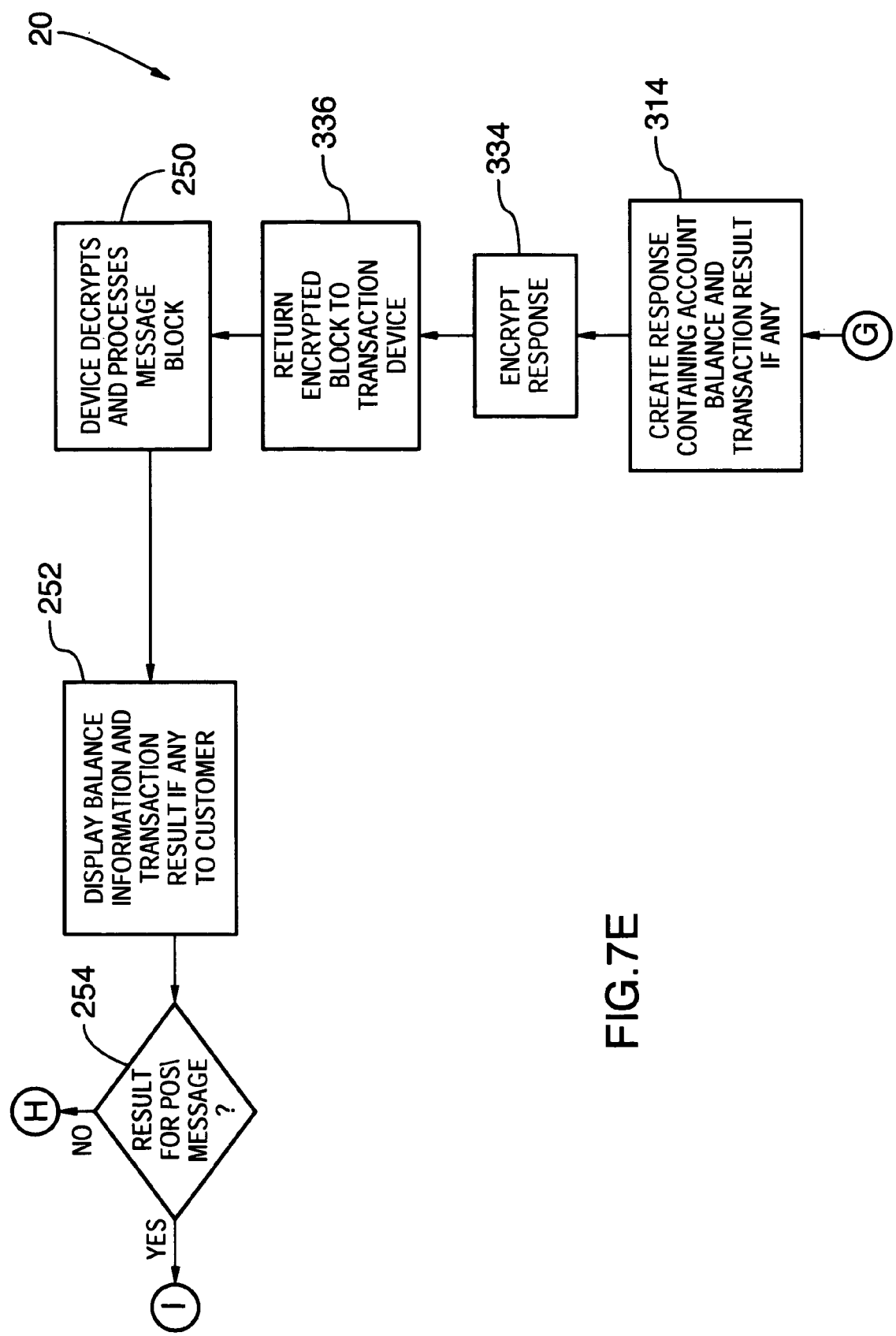

Referring now to FIG. 1 of the drawings, there is shown a simplified electronic balance checking and credit approval, system 20 according to the present invention. The system 20 preferably includes a point-of-sale (POS) system 22 that is situated in a transaction location or retail store 10, a transaction terminal 30 facing a customer 14 (as best seen in FIGS. 4 to 6), a computer network 60, and an authentication subsystem 70 which is preferably situated in a back-end location 12. It is noted that the transaction location need not necessarily be located in the retail store 10, but might instead, in the case of a transaction occurring over a global computer network such as the Internet 69, be situated in a home of the consumer 14. Likewise, the back-end location 12 is preferably situated remotely of the retail store 10, but it might alternately be situated on its premises.

Figure 2:
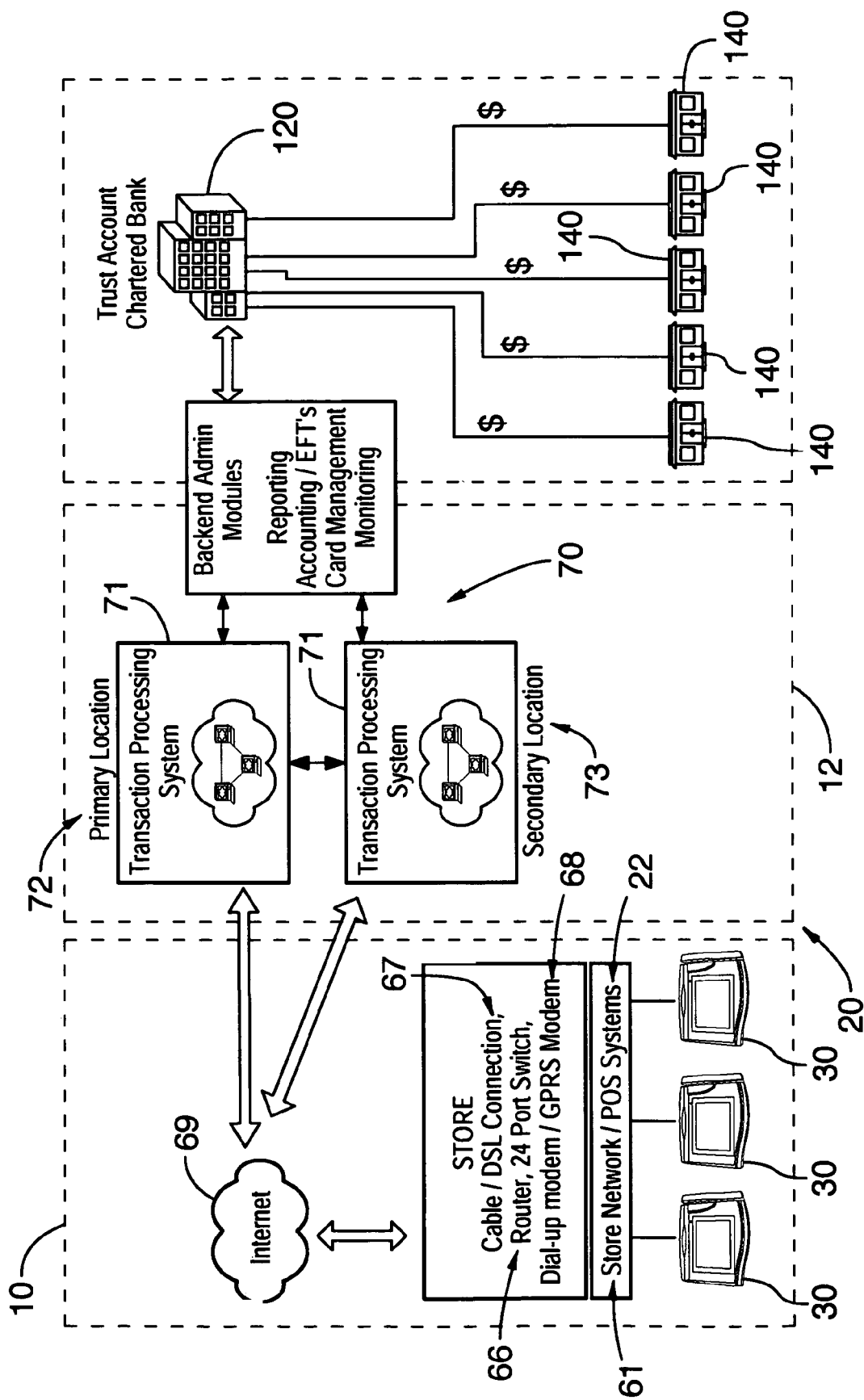
FIG. 2 is a diagrammatic representation and overview of a balance checking portion of the system of FIG. 1, depicting store, backend, and trust account activity.

FIG. 2 depicts in somewhat more detail the system 20 shown in FIG. 1, with like reference numerals being used to denote like components. In the retail store 10, and as shown in FIG. 2, a cashier (not shown) may use a POS register 24 of the point-of-sale (POS) system 22 to enter an order or re-charge amount. A display screen 32 of the transaction terminal 30 then displays either an order display 40 (as best seen in FIG. 5) or a recharge display 50 (as best seen in FIG. 6), as appropriate. The customer 14 then swipes an authentication token 100 (as best seen in FIGS. 4 to 6), which may be in the form of a plastic card 102 bearing a magnetic stripe. Thereafter, the terminal 30 sends a verification request, preferably over the computer network 60, to a transaction processing system 71 of the authentication subsystem 70. Following verification (according to a manner described in greater detail hereinbelow), the transaction processing system 71 sends an acknowledgment signal back to the terminal 30, and the terminal 30 sends a confirmation signal to the POS register 24 of the point-of-sale (POS) system 22, so as to complete the order or recharge. It is noted that, in an alternate embodiment of the system 20, the transaction processing system 71 might send the confirmation signal directly to the POS register 24 at substantially the same time that it sends the acknowledgment signal to the terminal 30.

Figure 3:
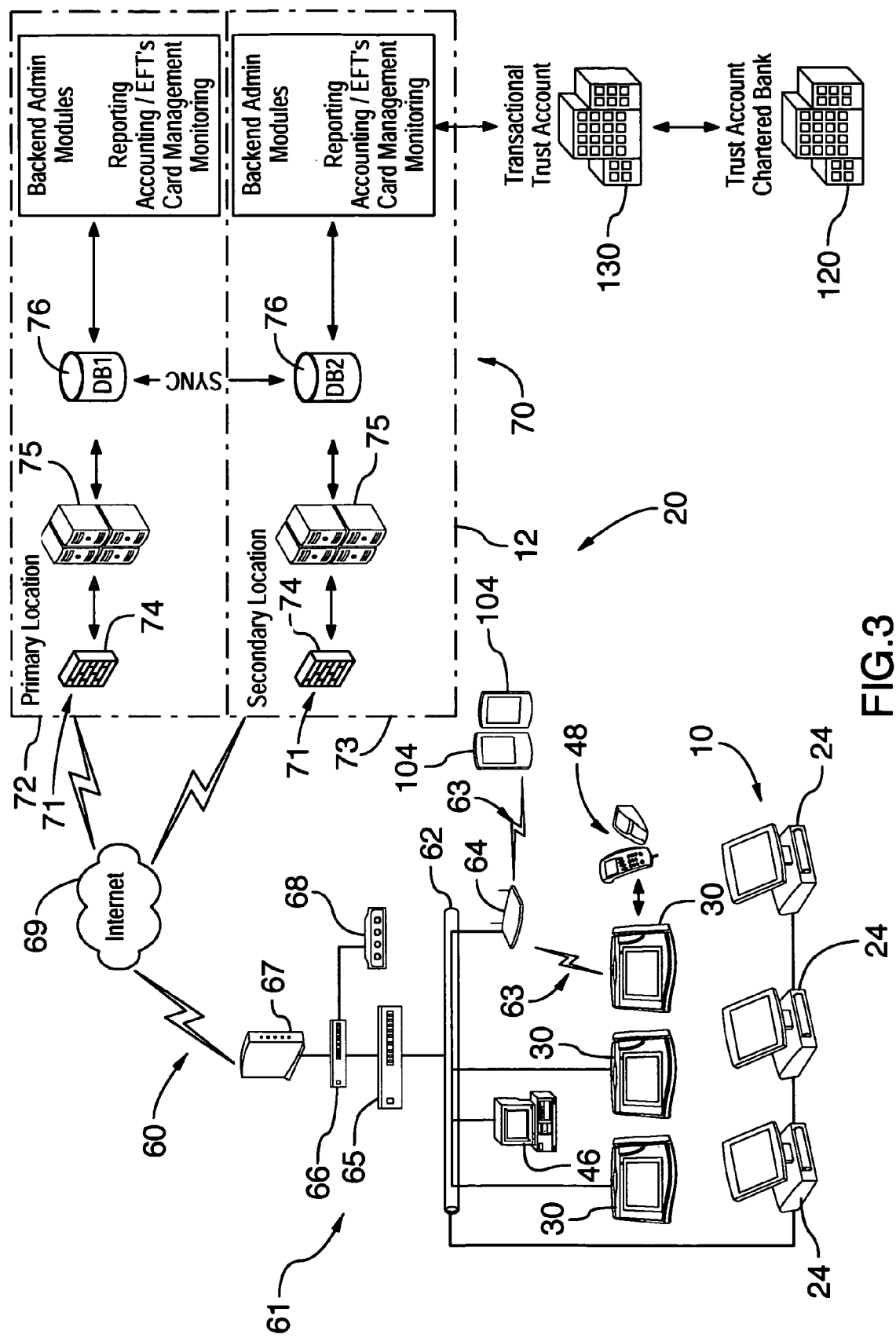
FIG. 3 is a diagrammatic representation of the balance checking portion of the system of FIG. 2, showing one preferred embodiment of the store and backend architecture.

When a store manager (not shown) closes the retail store 10 at the end of the day, a store closing signal is automatically sent by the POS system 22, preferably over the computer network 60, to the transaction processing system 71 situated in primary and secondary locations, 72 and 73, of the backend location 12. Preferably, and as best seen in FIG. 3, a processing server 75 is provided at each one of the primary and secondary locations, 72 and 73, and each processing server 75 is responsible for updating and maintaining a local accounts database 76. As best seen in FIG. 3, each of the local accounts databases 76 is constantly being synchronized with each other one of the local accounts databases 76. It is noted that, while primary and secondary locations, 72 and 73, are shown in FIGS. 2 and 3, there are preferably many more such locations, so as to maximize the probability that at least one such location will, at all times, be connected to the computer network 60 (e.g., even in the event of a partial network failure), and so as to minimize the risk of database 76 loss (e.g., in the event of a fire, flood, or hardware failure).

When the transaction processing system 71 receives the store closing signal from the retail store 10, the processing servers 75 preferably electronically calculate and compile a back office report (not shown) which details all of the day's transactions (including the order and recharge amounts) wherein the system 20 was utilized at that retail store 10. The back office report lists an electronically calculated daily net difference amount which is equal to the net difference between the order and recharge amounts for the retail store 10 on that particular day, less any transaction fees that may be due to a transaction processing entity (not shown) that is responsible for remotely carrying out the authentication subsystem 70. When the transaction processing system 71 receives the store closing signal from the retail store 10, as aforesaid, the authentication subsystem 70 also creates an Electronic Funds Transfer (EFT) file (not shown), and sends the EFT file to a trust account chartered bank 120.

The bank 120 manages all monetary value that has been ascribed to the authentication tokens 100 or cards 102 and facilitates a transfer of electronic funds to and from the retail stores 10 on a daily basis. The bank 120 is also responsible for paying the transaction fees to the transaction processing entity (not shown) as aforesaid. The bank 120 debits or credits, as appropriate, the daily net difference amount to a transactional trust account 130 based on its receipt of the EFT file, whilst simultaneously debiting or crediting a corresponding but opposite amount that is split between a retail store account 140 (as best seen in FIG. 2) and a back-end account (not shown) that is maintained by the transaction processing entity (not shown).

As best seen in FIG. 3, the computer network 60 may include an in-store network 61 and a global computer network, such as, for example, the Internet 69. The in-store network 61 may include an Ethernet connection 62 to which each of the POS registers 24 may be operatively connected. A portion of the in-store network 61 may also be a wireless network 63 operatively connected to the Ethernet connection 62, so as to enable electronic communication between a wireless access point 64 in the retail store 10 and one or more of the terminals 30, or directly between the wireless access point 64 and the customer's authentication token 100 which may be provided in the form of a wireless handheld device 104 (such as, for example, a PDA or a cell phone). The in-store network 61 preferably also includes a network switch 65 operatively interposed between the Ethernet connection 62 and a router 66. The router 66 is preferably to at least one of a cable/DSL modem 67 and GPRS/Dial modem 68, so as to enable operative connection to the internet 69. Notably, the transaction processing systems 71 preferably include an electronic firewall 74 at each of the primary and secondary locations, 72 and 73, with the firewall 74 being operatively interposed between the processing server 75 and the Internet 69.

In one exemplary use, a customer 14 has a prepaid account with a retail store 10. In this case, the customer's authentication token 100 may be the card 102 bearing the magnetic stripe that is encoded with one or more account identifiers. The customer 14 seeking to make a purchase at the retail store 10 may be unsure of the current balance in his or her account. The default state of the terminal 30 is a balance-checking mode 34, wherein the display 32 prompts the customer 14 to "swipe for balance" (as best seen in FIG. 4). The state of the terminal 30 is indicated to the customer 14 via the electronic display 32. If the customer 14 wishes to check his or her account balance, the customer 14 can swipe his or her card 102 on a card reading portion 36 of the terminal 30, when the terminal 30 is in the balance-checking mode 34. The terminal 30 electronically communicates with the authentication subsystem 70 and, following verification, the display 32 presents the customer 14 with the balance remaining on his account (as best seen in FIG. 4). At this point, the customer 14 can feel confident that sufficient funds are available to make a purchase.

The display 32 may also present customer 14 with an amount, if any, of credit (not shown) which is being extended to him. That is, for example, in the event that the customer has a low or zero balance, the transaction processing entity (not shown) or the retail store 10 may extend credit to the customer 14 (i.e., over and above the customer's account balance). The extension of credit in this manner is optional but may be especially preferred in circumstances when the customer 14 has a good payment history, or when the retail store 10 or transaction processing entity is conducting a marketing promotion.

That is, the amount of funds that is presented as being available to the consumer 14 on the display screen 32 of the terminal 30 might represent the actual amount prepaid to an account, a line of credit extended to a consumer through the system, or a combination both. Any credit given may be based on a consumer's overall credit rating, or may be based on the consumer's track record of usage on the prepaid system.

The point of sale (POS) system 22 of the retail store 10 is operative electronically interfaced with the terminal 30, so as to enable the terminal 30 to receive input from the POS system 22 regarding the amount of funds for a particular transaction. In the event that the customer 14 chooses, to authorize a transaction using his prepaid account, the cashier uses the POS register 24 to send the amount to the terminal 30. The terminal 30 then displays the amount to be authorized (as best seen in FIG. 5) to the customer 14 and displays a "swipe card" prompt 44 to the customer 14. The terminal 30 communicates via the computer network 60 to the transaction processing system 71 to authorize and record the transaction. The result of the transaction is communicated to the merchant's point of sale (POS) system 22 through the computer network 60. The result of the transaction and the remaining balance of the customer's account is then communicated to the customer 14 via the display 32 on the terminal 30.

In use, a consumer 14 interfaces the authentication token 100 with the terminal 30. The token 100 might take the form of the card 102 bearing the magnetic stripe, or it might be in the form of an RFID token or tag (such as, for example, the wireless handheld device 104, PDA, or cell phone), a token bearing a barcode (not shown), or a biometric (not shown), or some other means of storing account identifiers. The terminal 30 is provided with an interface means which may vary significantly depending on the nature of the token 100. For example, and as best seen in FIGS. 4 to 6, the card 102 may be swiped through the card reading portion 36 of the terminal 30. Similarly, and as best seen in FIG. 3, the RFID token 104 would only need to be brought substantially within a general proximity of the wireless access point 64 which, as such, might stand substantially in place of the terminal 30. [As such, it will be appreciated that the terminal 30 may take the form of the wireless access point 64, with the display 32 actually being situated on the wireless handheld device 104.] Alternately, the RFID token 104 might be brought substantially within a general proximity of an RFID signal reading portion (not shown) of the terminal 30.

The terminal 30 then reads one or more account identifiers (not shown) from the token 100 and establishes a secure connection via the computer network 60 (which, as aforesaid, preferably includes the Internet 69) to the authentication subsystem 70 which consists of various hardware and software, along with the local accounts database 76.

The account identifier(s) are passed from the terminal 30 to the authentication subsystem 70 along with identifiers (not shown) associated with the terminal 30, and an indicator of the nature of the transaction to be processed. The authentication subsystem 70 then validates the account identifiers and device identifiers. The authentication subsystem 70 determines, among other things, the local currency that is associated with the terminal 30 by reading the identifiers and other values stored in the associated terminal's profile. If the indicated transaction type indicated is a balance-checking request, the authentication subsystem 70 returns the account balance associated with the account identifiers in the currency local to the terminal 30 (as best seen in FIG. 4). If the indicated transaction type is a request to increment or decrement the balance of the identified account, the authentication subsystem 70 checks the details of the transaction against predetermined business rules and returns the transaction's outcome and resulting balance to the terminal 30 (as best seen in FIGS. 5 and 6). The business rules could include checks against pre-determined spending limits, fraud detection algorithms, or determination of available credit.

Preferably, the electronic display 32 of the terminal 30 visually presents the balance returned by the authentication subsystem 70 within view of the consumer 14.

The system 20 includes a method for authenticating an electronic transaction. The system 20 receives a transaction request and one or more account identifiers from at least one authentication token 100. The system 20 is capable of authenticating the electronic transaction based at least in part on successfully verifying the account identifiers over a packet switched computer network 60. The system 20 might verify a plurality of identifiers in response to the received transaction request, and the account identifiers may be just one of the plurality of identifiers. The plurality of identifiers may include, among other things, (i) one or more account identifiers, (ii) a consumer driven balance-checking request, (iii) an automated request generated by a retail POS system, (iv) an electronic signature, (v) a biometric, (vi) a radio frequency signal, and (vii) a magnetic stripe card. The one or more account identifiers may preferably be linked with a profile of the consumer 14.

The system 20 may also decode received, encoded messages that include data associated with one or more of the plurality of identifiers.

In receiving the aforesaid transaction request, the system 20 receives an account balance verification request using the account identifiers that are associated with the authentication token 100. The system 20 then verifies enrollment of the account identifier in the authentication program, and transmits a response to the terminal 30 based on the verification. Preferably, the system 20 then displays the account balance associated with the verified account to the consumer 14 (as best seen in FIG. 4).

Alternately, in receiving the aforesaid transaction request, the system 20 might receive a request to process an account debiting or crediting transaction. The system 20 once again obtains one or more account identifiers from the authentication token 100. The system 20 then verifies enrollment of the account identifiers in the authentication program, over the packet switched computer network 60, using the remote authentication subsystem 70. The system 20 verifies the eligibility of the transaction based on the associated account profile and transmits a response from the remote authentication subsystem 70 based on the verification. The terminal 30 then displays the transaction result to the consumer 14, and relays the transaction result to the retail POS register 24. Finally, the terminal 30 may display the transaction result and any new account balance associated with the verified account to the consumer 14 (as best seen in FIGS. 5 and 6). The system 20 may store information related to the authentication of the electronic transaction.

According to the system 20, the terminal 30 is preferably provided with one or more standard input devices, such as, for example, the card reading portion 36 thereof. Alternately, the standard input device may include a touchscreen, a biometric scanner, or an RF receiver, among other things. The input device may include means for receiving information related to a personal identifier, such as, for example, a PIN code (as may be entered upon a PIN pad 48), a signature of the customer 14, or a password. The terminal 30 may be adapted to receive and decode a radio frequency signal and include the decoded information in the verification message. The terminal 30 may also be adapted to read and decode the magnetic stripe card 102 and include the decoded information in the verification message. Alternately, the authentication subsystem 70 may be adapted to decode received, encoded messages that include data that related to one or more of a plurality of identifiers.

The terminal 30 is configured to validate the credentials and/or formatting of input from the authentication token 100 and transmit an account verification request to the authentication subsystem 70 indicating the account identifiers and the interface used. The terminal 30 preferably also encrypts the verification request before transmitting the verification message to the authentication subsystem 70.

As aforesaid, and as best seen in FIG. 4 to 6, the display 32 of the terminal 30 is preferably adapted to present a message to the consumer indicating the status or outcome of the transaction.

The terminal 30 is adapted to read one or more account identifiers stored in the authentication token 100 and transmit a verification request along with the account identifiers stored in the authentication token 100. The terminal 30 receives information related to the plurality of identifiers, with the presence of the authentication token 100 being just one of the identifiers. The plurality of identifiers may include, alone or in combination, and among other things, any of the following: an account identifier, a personal identifier that may or may not be linked with the profile of the consumer 14, a biometric, and an electronic signature. The verification request also includes the received information related to the plurality of identifiers. As indicated hereinabove, the terminal 30 may be further configured to transmit an identifier associated with the terminal 30, along with transaction information related to the electronic transaction, to the authentication subsystem 70. The terminal 30 is adapted to receive an authentication message in response to the verification request. The terminal 30 is further configured to forward the authentication response to the retail POS system 22 so as to complete the electronic transaction. The terminal 30 displays the authentication response and account balance to the consumer.

The system 20 includes the authentication subsystem 70 that is configured to receive the transaction request and to verify the presence of the account identifiers on the authentication token 100 as read at the terminal 30. The authentication subsystem 70 authenticates the electronic transaction based at least in part on successfully verifying the account identifiers.

The authentication subsystem 70 may be further configured to receive a request to verify enrollment of the account identifiers associated with the authentication token 100 in the authentication program. The authentication subsystem 70 then verifies enrollment of the account identifier in the authentication program, and transmits a response to the terminal 30 based on the verification. The authentication subsystem 70 may be further adapted to store information related to the authentication of the transaction.

In this manner, the system 20 provides for real-time consumer initiated account balance inquiries and automated authentication of electronic transactions. The system 20 can be integrated into existing POS systems 22 or act as a standalone system. The system adds or removes amounts from accounts using account identifiers stored on the authentication token 100 such as a magnetic stripe card 102, an RFID device 104, a Smart Card, a barcode, or linked biometric information. At any time a consumer can approach one of the terminals 30 of the system 20 and obtain a real-time balance of his or her account through an audible or visual response from the terminal 30 (as best seen in FIG. 4).

The following parts, assemblies and subsystems are illustrated in the figures and described herein in association with the corresponding reference numerals listed therebeside:

Retail store—10
 Back-end location—12
 Customer—14
 Electronic balance checking and credit approval system—20
 Point-of-sale (POS) system—22
 POS register—24
 Transaction terminal—30
 Display screen—32
 Balance-checking mode 34
 Card reading portion—36
 Order display—40
 "Swipe card" prompt—44
 Back Office PC—46
 PIN pad—48
 Recharge display—50
 Computer network—60
 In-store network—61
 Ethernet connection—62
 Wireless network—63
 Wireless access point—64
 Network switch—65
 Router—66
 Cable/DSL modem—67
 GPRS/Dial modem—68
 Internet—69
 Authentication subsystem—70
 Transaction processing system—71
 Primary location—72
 Secondary location—73
 Electronic firewall—74
 Processing server—75
 Local accounts database—76
 Authentication token—100
 Plastic card—102
 Wireless handheld device—104
 Trust account chartered bank—120
 Transactional trust account—130
 Retail store account—140

In the figures, like reference numerals are used to refer to analogous structures in the different views and embodiments.

A diagrammatic flowchart of a preferred embodiment of the system 20 according to the invention is shown in FIGS. 7A to 7E. It will be appreciated that each of FIGS. 7A through 7E leads into at least a respective one other one of FIGS. 7A through 7E, through one or more of encapsulated areas "A" through "I". It will be appreciated that FIGS. 7A to 7E may hereinafter be collectively referred to as "FIG. 7". Now, therefore, according to the method depicted in FIG. 7, the transaction terminal 30 awaits activity in step 200. Proceeding from step 200, in step 202, the terminal 30 queries whether there is any such activity. In the event that there is no such activity, in step 204, the terminal 30 prompts the customer 14 to use their authentication token 100 to perform a balance check. In the contrary event that there is activity, in step 206, the terminal 30 queries whether the customer 14 is performing a balance check. In the event that the customer 12 is seeking to perform a balance check, the system 20 proceeds to step 208, whereat account identifiers are read from the customer's authentication token 100. The system 20 then, in step 210, combines the account identifiers from the authentication token 100 with identifiers from the terminal 30 and encrypts same. The system then proceeds to step 212 which will be described in further detail hereinbelow.

In the event that, in step 206, the system 20 determines that the customer is not seeking to perform a balance check, the system proceeds to step 214, whereat it queries whether it has received a purchase request. If it has received a purchase request, the terminal 30 displays a prompt 44, in step 216, for the customer 14 to interface the authentication token 100 with the terminal 30. In step 218, the system 20 then queries whether it has received input from the token 100. If it has not, the system 20 returns to step 216. If, in step 218, the system 20 determines that it has received input from the token 100, it proceeds to step 220 which will be described in detail hereinbelow.

In the event that, in step 214, the system 20 determines that it has not received a purchase request, it proceeds to step 222, whereat the system 20 queries whether it has received an account recharge request. If the system 20 determines that it has not received an account recharge request, it proceeds to step 230, whereat it determines and logs that an invalid request type has been received before returning to step 204. If, in step 222, the system 20 determines that it has received an account recharge request, it proceeds to step 224, whereat the terminal 30 displays a recharge amount and a prompt 44 for the customer 14 to interface the authentication token 100 with the terminal 30. In step 226, the system 20 then queries whether it has received input from the token 100. If it has not, the system 20 returns to step 224. If, in step 226, the system 20 determines that it has received input from the token 100, it proceeds to step 220.

In step 220, account identifiers are read from the customer's authentication token 100. The system 20 then, in step 228, combines the account identifiers from the authentication token 100 with identifiers from the terminal 30 and encrypts same. The system then proceeds to step 212.

In step 212, the system 20 transmits the encrypted block of data to the authentication subsystem 70, and proceeds to step 300.

In step 300, the authentication subsystem 70 decrypts the encrypted block of data. Thereafter, in step 302, the system initiates a validation procedure, starting with step 304, to determine whether the decrypted block of data is valid. In steps 304 and 306, the system 20 attempts to validate the terminal identifiers from the terminal 30. In the event that the terminal identifiers are invalid, the system 20 proceeds to step 308 which will be described in detail hereinbelow.

If, in step 306, the terminal identifiers are determined to be valid, the system 20 proceeds to step 310. In steps 310 and 312, the system 20 attempts to validate the account identifiers received from the authentication token 100. If the account identifiers are determined to be valid, the system 20 proceeds to step 316 which will be described in greater detail hereinbelow. In the event that the account identifiers are invalid, the system 20 proceeds to step 308.

In step 308, the system 20 preferably logs an exception, as a result of the query in either of steps 306 or 312, and proceeds to step 314 which will be described in greater detail hereinbelow.

In step 316, the system 20 initiates a procedure, starting with step 318, to determine the transaction type. In step 318, the system 20 queries whether the decrypted block of data relates to a purchase request. If so, the system 20 then queries, in step 320, whether funds or credit are available. If so, the system proceeds to step 322, whereat the customer's account is decremented in the local accounts database 76 and the system 20 generates an approval message. From step 322, the system proceeds to step 314, which will be described in greater detail hereinbelow. If, in step 320, the system 20 determines that insufficient funds or credit are available, then it proceeds to step 324, whereat the system 20 generates a declined message. The system 20 then proceeds from step 324 to step 314 which will be described in greater detail hereinbelow.

If, in step 318, the system 20 determines that the decrypted block of data does not relates to a purchase request, the system proceeds to step 326. In step 326, the system 20 queries whether the decrypted block of data relates to an account balance check. If so, the system 20 proceeds to step 328, whereat the current balance relating to the account identifiers is obtained from the local accounts database 76. The system 20 then proceeds from step 328 to step 314 which will be described in greater detail hereinbelow.

If, in step 326, the system 20 determines that the decrypted block of data does not relates to an account balance check, the system proceeds to steps 330 and 332. In steps 330 and 332, the system 20 determines that the decrypted block of data relates to a recharge request, and increments the customer's account in the local accounts database 76 by the specified amount. The system 20 then proceeds from step 328 to step 314.

In step 314, the system 20 creates a response that contains the account balance and any transaction result. Thereafter, in step 334, the system 20 encrypts the response created in step 314 and, in step 336, returns the encrypted block of data to the terminal 30. From step 336, the system 20 proceeds to step 250.

In step 250, the terminal 30 decrypts and processes the returned encrypted block of data. The terminal 30 then, in step 252, displays balance information and any transaction result to the customer 14. In step 254, the terminal 30 then queries whether there is a transaction result to be sent to the POS register 24. If so, the terminal 30 sends the transaction result to the POS register in step 256 and returns to step 200. If not, the terminal returns directly to step 200.

According to the invention, as further described hereinbelow, and as depicted diagrammatically in FIGS. 8A and 8B, there is also disclosed a method of approving a credit card transaction that preferably enables credit card transactions to be processed more quickly and in a substantially reliable manner. It will be appreciated that FIG. 8A leads into FIG. 8B through encapsulated area "J", and FIG. 8B leads back into FIG. 8A through encapsulated areas "K" and "L". As discussed hereinbelow, the method preferably also ensures that there is an appropriate payment history associated with a particular credit card before approving any particular corresponding credit card transaction, notably substantially without storage of a user's personal credit card information.

Figure 8A:
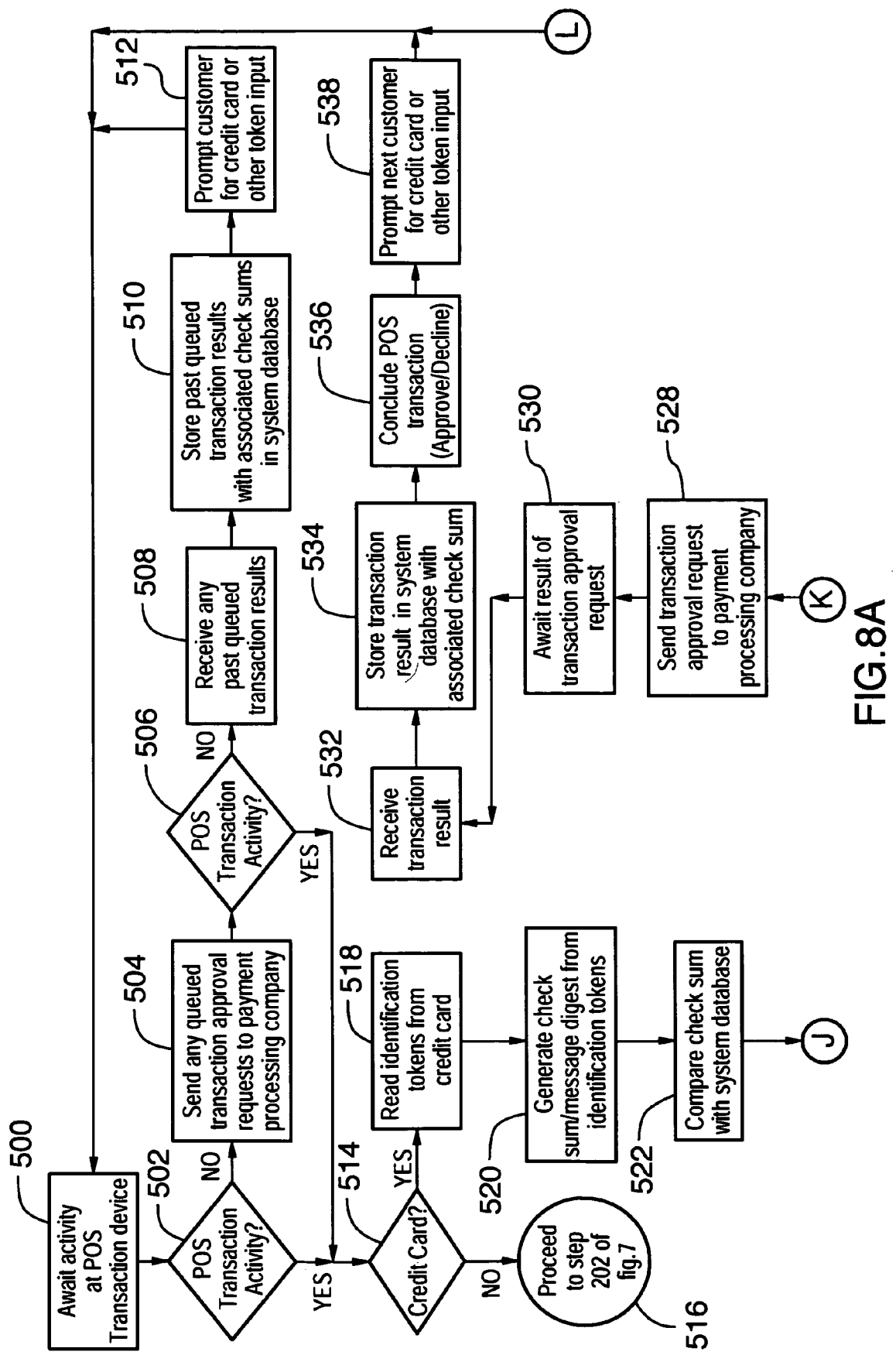
FIGS. 8A and 8B together depict a diagrammatic flowchart of a method and system according to one preferred embodiment of a credit approval portion of the system of FIG. 1.
Figure 8B:
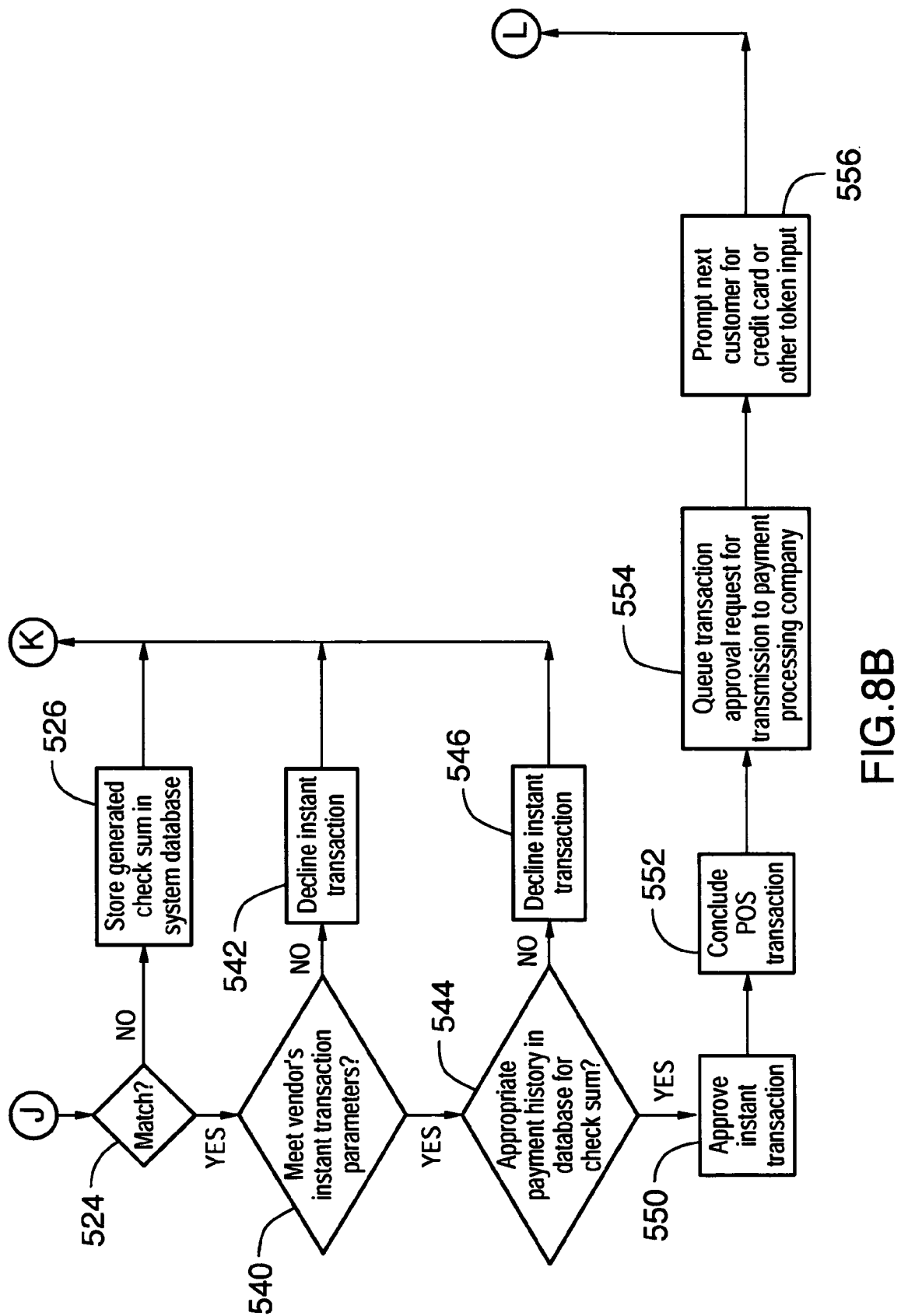

More specifically, and according to a preferred embodiment of the system 20 that is shown in FIG. 8A, the POS terminal 30 electronically receives, in step 502, a set of identification tokens from a credit card or other transaction token. In step 514, the system may then preferably, but not necessarily, assess whether the identification tokens have been received from a credit card.

In the event that the system determines, in step 514, that the identification tokens have not been received from a credit card, the system proceeds to step 516, wherefrom the system may preferably, but not necessarily, proceed to step 202 of FIG. 7. From step 202 of FIG. 7, the system may proceed substantially, mutatis mutandis, as directed hereinabove. In this regard, it is noted that according to the present credit card processing aspect of the invention, the system may preferably, but not necessarily, return to step 500 of FIG. 8A, instead of to step 200 of FIG. 7, any time that a return to the latter named step might otherwise have been directed hereinabove.

In the event that the system determines, in step 514, that the identification tokens have been received from a credit card, the system receives a set of identification tokens from a particular credit card (in step 518), and in step 520, electronically generates, using an algorithmic model, a practically unique check sum and/or message digest for any particular credit card and its identification tokens. An example of an algorithmic model that may be suitable for use with the system 20 of the present invention may include MD5 and/or one of the SHA (Secure Hash Algorithm) family of algorithms. The SHA family of algorithms is a set of related cryptographic hash functions. The most commonly used function and/or algorithm in the family, SHA-1, is employed in a large variety of popular security applications and protocols, including TLS, SSL, PGP, SSH, S/MIME, and IPSec, and may be suitable for use with the present system 20.

According to the invention, the check sum and/or message digest that is generated from any particular set of credit card identification tokens is practically unique, or substantially unique for substantially all practical purposes, insofar as hash collisions (i.e., wherein substantially the same hash might be returned from two different inputs) may preferably be negligible and/or exceedingly rare, with the algorithmic model being substantially collision resistant. Preferably, the algorithmic model substantially encrypts the credit card identification tokens in the form of the generated check sum and/or message digest, such that neither the identification tokens nor the particular credit card may reasonably be discernable therefrom.

According to the preferred embodiment of the invention, in step 522, the system 20 electronically compares the generated check sum with check sums that have been previously stored in an electronic database.

In the event that the generated check sum does not match any of the check sums already stored in the database (as determined in step 524 of FIG. 8B), the system preferably sends a transaction approval request to an appropriate credit card issuing bank, typically through an intermediary payment processing company (in step 528). The generated check sum is preferably stored in the system 20 database (in step 526) together with one or more returned results of the transaction approval requests, when they are returned from the issuing bank (in steps 508 and 510).

In the alternate event that (in step 524, the system determines that) the generated check sum matches one of the check sums already stored in the database, the system preferably generates a transaction approval database query of the database to ascertain whether there is also an appropriate payment history associated with the generated check sum (in step 544).

If there is a favorable payment history recorded in the database, the database query will return a database query result approving the particular credit card transaction on a substantially instantaneous basis (in step 550).

If, on the other hand, there is an unfavorable payment history recorded in the database, the database query will similarly return a database query result declining the particular credit card transaction on a substantially instantaneous basis (in step 546).

In determining whether there is a favorable or an unfavorable payment history recorded in the database, an analysis may be performed of the returned results of the previous transaction approval requests that have been associated with the generated check sum and the particular credit card.

According to the preferred embodiment of the system 20, the approval or decline of any particular credit card transaction is preferably also determined in further dependent relation upon a predetermined set of instant approval parameters (in step 540). The approval parameters may be selectively predetermined by the merchant 10 operating the POS terminal 30, and/or may include predetermined parameters that are specific to the dollar amount, the time of day, and/or the product associated with the transaction approval database query.

It may also be worthwhile to note that, according to the preferred embodiment of the system 20, after the credit card holder 14 has concluded the transaction at the POS terminal 30 (in step 552), the system 20 preferably sends the transaction approval request to the appropriate credit card issuing bank (in step 504), and awaits the returned result (in step 508)—notably without still also requiring the continued presence of the credit card holder 14 at the POS terminal 30.

Other modifications and alterations may be used in the design and manufacture of other embodiments according to the present invention without departing from the spirit and scope of the invention, which is limited only by the claims which are to be filed as part of a regular patent application that claims priority herefrom.

We claim:

1. A balance checking transaction system for use by a consumer, a transaction processing entity, a vendor, and one or more trust account chartered banks in conducting an electronic transaction over a communication network, said system comprising:
   a) a first consumer account held by the transaction processing entity on behalf of the consumer;
   b) a consumer specific token, held by the consumer, comprising a token data set that identifies said first consumer account;
   c) an input device that receives said token data set from the consumer specific token and transmits said token data set along with an input device datum over the communication network;
   d) authentication hardware and software code capable of execution by the hardware, situated substantially remotely of said input device, that receives said token data set over the communication network and verities said token data set and said input device datum against at least one database containing a plurality of archived data sets and input device data, so as to retrieve an account balance datum that is currently associated with said first consumer account, with said authentication hardware and software code thereafter transmitting said account balance datum over the communication network on a substantially instantaneous basis; and
   e) an output device, situated substantially locally to said input device, that receives said account balance datum over the communication network and provides said account balance datum to the consumer on said substantially instantaneous basis;
   f) a point-of-sale subsystem, operated by the vendor, that electronically interfaces with said authentication hardware and software code over the communication network, so as to enable the electronic transaction to be conducted substantially concurrent with provision of said account balance datum to the consumer as aforesaid;
   g) a transaction account held by a first one of the banks on behalf of the transaction processing entity, with said first one of the banks, responsive to a decrement request of the transaction processing entity, transferring an amount of funds from said transaction account to the vendor in respect of the electronic transaction;
   h) a checksum database having a plurality of archived checksum values stored therein, with each respective one of said archived checksum values having at least one related archived payment history value that is likewise stored in said checksum database; and
   i) a transaction authentication subsystem for electronically generating, and sending to said point-of-sale subsystem, a preliminary approval signal on a substantially instantaneous basis that does not require communication with a credit extending entity at the time of generating said preliminary approval signal when said account checksum value matches a corresponding one of said archived checksum values, provided that its said related archived payment history value complies with one or more predetermined approval criteria;
   wherein, when said preliminary approval signal is received by said point-of-sale subsystem, said point-of-sale subsystem provides preliminary approval of the electronic transaction on a substantially instantaneous basis and substantially before receiving a final result signal.

2. A system according to claim 1, wherein said input device enables the consumer to selectively conduct a balance query, such that said output device provides said account balance datum before enabling the electronic transaction to be conducted.

3. A system according to claim 1, wherein said input device enables the consumer to selectively conduct a purchase query, such that the electronic transaction is conducted immediately prior to provision of said account balance datum to the consumer, with said authentication hardware and software code debiting a purchase amount to said first consumer account substantially immediately after the electronic transaction, such that said account balance provided by said output device to the consumer indicates said purchase amount having been debited from said first consumer account.

4. A system according to claim 1, wherein said input device enables the consumer to selectively send a recharge request to the authentication hardware and software code in order to recharge said first consumer account, with said recharge request including a recharge amount which is credited by said authentication hardware and software code to said first consumer account; and
   wherein said system further comprises a second consumer account held by one of said first one of the banks and a second one of the banks on behalf of the consumer, with one of said first one of the banks and said second one of the banks, responsive to an increment request of the transaction processing entity, transferring an amount of funds from said second consumer account to said transaction account in respect of the recharge request.

5. A system according to claim 1, wherein said input device substantially encrypts said token data set along with said input device datum, as an encrypted block which is then transmitted over the communication network; and
   wherein said authentication hardware and software code decrypts said encrypted block into said token data and said input device datum, before verifying said token data set and said input device datum against said at least one database as aforesaid.

6. A system according to claim 1, wherein said input device and said output device are together provided within a single terminal.

7. A system according to claim 6, wherein said terminal is situated substantially adjacent to said point-of-sale subsystem, such as to enable the terminal to receive the token data set from the consumer specific token, held by the consumer, substantially adjacent to the point-of-sale subsystem.

8. A system according to claim 1, wherein said input device and said output device are situated substantially remotely of said point-of-sale subsystem.

9. A system according to claim 1, further comprising a plurality of supplemental input devices and supplemental output devices, with each respective one of said supplemental input devices having a supplemental input device datum, with each said supplemental input device datum being substantially unique to each said respective one of said supplemental input devices, so as to enable said account balance datum to be directed to a corresponding one of said supplemental output devices which is situated substantially locally to said respective one of said supplemental input devices.

10. A system according to claim 1, wherein said output device comprises a display screen that displays said account balance datum within view of the consumer.

11. A system according to claim 1, wherein said consumer specific token is a plastic card including a readable magnetic strip.

12. A system according to claim 1, wherein said consumer specific token generates a radio frequency identification signal.

13. A system according to claim 1, wherein said token data set comprises at least one datum selected from the group consisting of numeric, alphabetic, photographic and pictographic data.

14. A system according to claim 1, wherein said token data set comprises at least one datum selected from the group consisting of personal data specific to the consumer, and data specific to at least one of said first consumer account, said transaction processing entity, said second consumer account, said bank, and said consumer specific token.

15. A system according to claim 14, wherein said personal data specific to the consumer comprises at least one personal datum selected from the group consisting of name data, home address data, birthdate data, and biometric data.

16. A system according to claim 14, wherein said at least one datum is additionally selected from the group consisting of account password data, token expiry date data, and token type data sufficient to identify the general type of said consumer specific token.

* * * * *